US010571568B2

(12) United States Patent
Iida et al.

(10) Patent No.: US 10,571,568 B2
(45) Date of Patent: Feb. 25, 2020

(54) DISTANCE MEASURING DEVICE, DISTANCE MEASURING METHOD, AND NON-TRANSITORY COMPUTER-READABLE STORAGE MEDIUM

(71) Applicant: FUJITSU LIMITED, Kawasaki-shi, Kanagawa (JP)

(72) Inventors: Koichi Iida, Kobe (JP); Takeshi Morikawa, Yokohama (JP); Jun Kawai, Kawasaki (JP); Koichi Tezuka, Kobe (JP); Kosuke Yanai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 345 days.

(21) Appl. No.: 15/715,296

(22) Filed: Sep. 26, 2017

(65) Prior Publication Data

US 2018/0106903 A1  Apr. 19, 2018

(30) Foreign Application Priority Data

Oct. 14, 2016 (JP) ................... 2016-202892

(51) Int. Cl.
| | |
|---|---|
| *G01S 17/10* | (2006.01) |
| *G01S 17/87* | (2006.01) |
| *G01S 7/497* | (2006.01) |
| *G01S 17/42* | (2006.01) |
| *G01S 7/481* | (2006.01) |

(52) U.S. Cl.
CPC ............ *G01S 17/10* (2013.01); *G01S 7/4817* (2013.01); *G01S 7/497* (2013.01); *G01S 17/42* (2013.01); *G01S 17/87* (2013.01)

(58) Field of Classification Search
CPC ........ G01S 7/4817; G01S 7/497; G01S 17/10; G01S 17/42; G01S 17/87
See application file for complete search history.

(56) References Cited

U.S. PATENT DOCUMENTS

| | | |
|---|---|---|
| 2004/0233414 A1 | 11/2004 | Jamieson et al. |
| 2005/0173770 A1 | 8/2005 | Linden et al. |
| (Continued) | | |

FOREIGN PATENT DOCUMENTS

| | | |
|---|---|---|
| JP | 2007-503004 A | 2/2007 |
| JP | 2007-527551 A | 9/2007 |
| (Continued) | | |

*Primary Examiner* — Eric L Bolda
(74) *Attorney, Agent, or Firm* — Fujitsu Patent Center

(57) ABSTRACT

A distance measuring device executes a collection process that includes driving a MEMS mirror in each of a plurality of sensors and collecting a drive voltage of the MEMS mirror satisfying a given condition, executes a drive frequency determination process that includes determining a drive frequency of the MEMS mirror when measuring distances by the plurality of sensors based on the drive voltage of the MEMS mirror, and executes a control signal generation process that includes generating and transmitting a control signal to the plurality of sensors, the control signal including configuration information specifying the drive frequency as a drive frequency of the MEMS mirror in each of the plurality of sensors, the configuration information including the drive frequency determined by the drive frequency determination process.

16 Claims, 20 Drawing Sheets

(56) References Cited

U.S. PATENT DOCUMENTS

| | | | | |
|---|---|---|---|---|
| 2016/0018256 A1* | 1/2016 | Mushimoto | ............ | G01J 1/0238 |
| | | | | 356/5.01 |
| 2016/0047895 A1* | 2/2016 | Dussan | ................. | G01S 7/4817 |
| | | | | 356/4.01 |
| 2018/0217237 A1* | 8/2018 | Irish | ....................... | G01S 7/4817 |

FOREIGN PATENT DOCUMENTS

| | | | |
|---|---|---|---|
| JP | 2015-118359 A | | 6/2015 |
| WO | 2005/078506 A2 | | 8/2005 |

\* cited by examiner

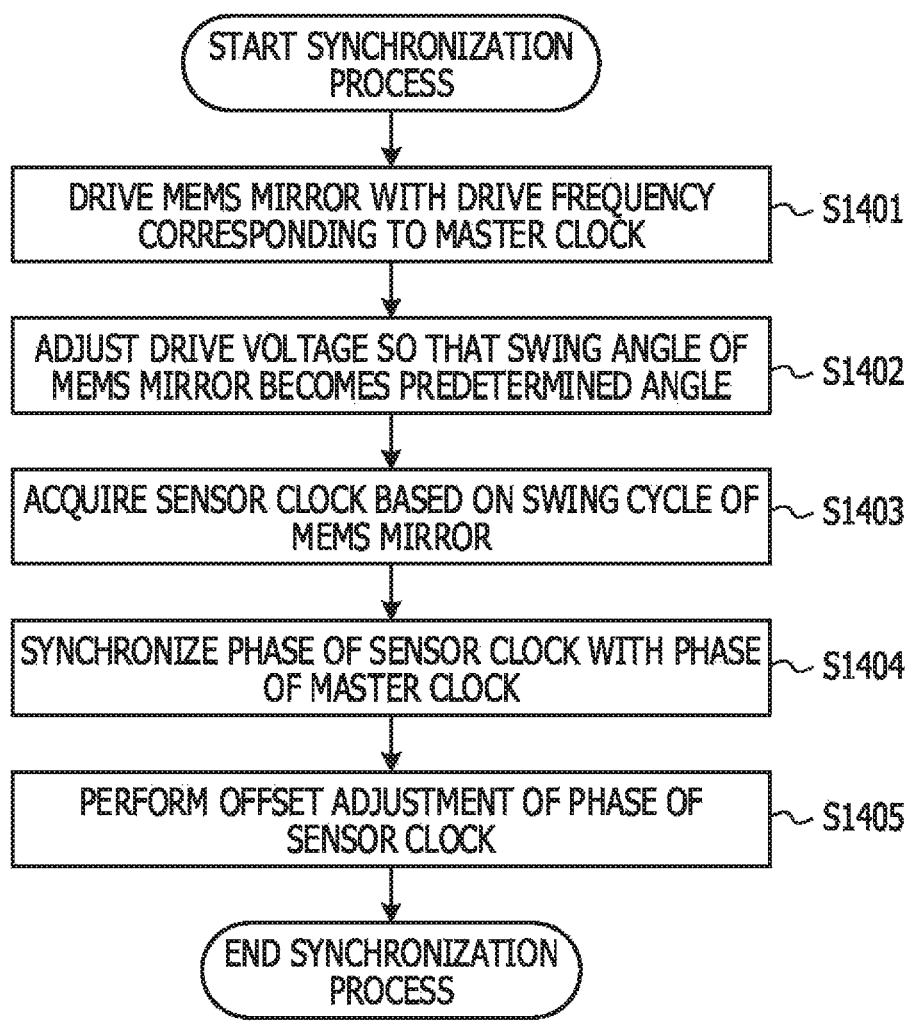

FIG. 15

| ANGLE IN VERTICAL DIRECTION | CORRECTION TIME |
|---|---|
| $\phi 1$ | T1 |
| $\phi 2$ | T2 |
| ⋮ | ⋮ |
| $\phi M$ | TM |

~279

DISTANCE MEASURING DEVICE, DISTANCE MEASURING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-202892, filed on Oct. 14, 2016, the entire contents of which are incorporated herein by reference.

FIELD

The embodiments discussed here are related to a distance measuring device, distance measuring method, and a non-transitory computer-readable storage medium.

BACKGROUND

A scanning-type distance measuring device using laser beam controls an emission direction of a laser beam by a micro electro mechanical systems (MEMS) mirror. In this type of distance measuring device, an MEMS mirror capable of swinging a mirror surface in two directions, a horizontal direction and a vertical direction is used, and the emission direction of the laser beam is changed at a regular speed in one direction in the vertical direction while the emission direction of the laser beam is swung in the horizontal direction. That is, in this type of distance measuring device, a MEMS mirror is used to two-dimensionally scan the laser beam in the emission direction within a desired measurement range (raster scan). At this time, the emission direction of the laser beam within the measurement range is swung by resonating the MEMS mirror with a resonance frequency.

The distance measuring devices of the related art include a plurality of sensors that emit and receive laser beams and measure distances simultaneously by the plurality of sensors.

Examples of the related art include Japanese National Publication of international Patent Application No. 2007-503004.

SUMMARY

According to an aspect of the invention, a distance measuring device includes: a memory; a processor coupled to the memory and configured to execute a collection process that includes driving a MEMS mirror in each of a plurality of sensors and collecting a drive voltage of the MEMS mirror satisfying a given condition, the plurality of sensors having the MEMS mirror that controls an emission direction of a laser beam with a same drive frequency, execute a drive frequency determination process that includes determining a drive frequency of the MEMS mirror when measuring distances by the plurality of sensors based on the drive voltage of the MEMS mirror, the drive voltage being collected by the collection process for each of the plurality of drive frequencies, and execute a control signal generation process that includes generating and transmitting a control signal to the plurality of sensors, the control signal including configuration information specifying the drive frequency as a drive frequency of the MEMS mirror in each of the plurality of sensors, and the configuration information including the drive frequency determined by the drive frequency determination process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart for explaining contents of a synchronization process performed by each sensor;

FIG. 15 is a diagram illustrating a correction amount table;

DESCRIPTION OF EMBODIMENTS

Individual differences in a resonance frequency are generated in MEMS mirrors due to variations in shapes and dimensions according to processing accuracy during manufacturing. For this reason, when an MEMS mirror included in each of a plurality of sensors is driven at a resonance frequency of each MEMS mirror, there is a difference in a frequency (frame rate) used to scan a measurement range one way with a laser beam. Therefore, in a case where resonating the MEMS mirror at the resonance frequency of each MEMS mirror to control an emission direction of the laser, it is difficult to synchronize the operations of the plurality of MEMS mirrors. Therefore, it is difficult to make measurement timings of the distances by the plurality of sensors including MEMS mirrors coincide.

In one aspect, the present disclosure aims to make the measurement timings of distances in a plurality of sensors including the MEMS mirrors coincide.

First Embodiment

Figure 1:
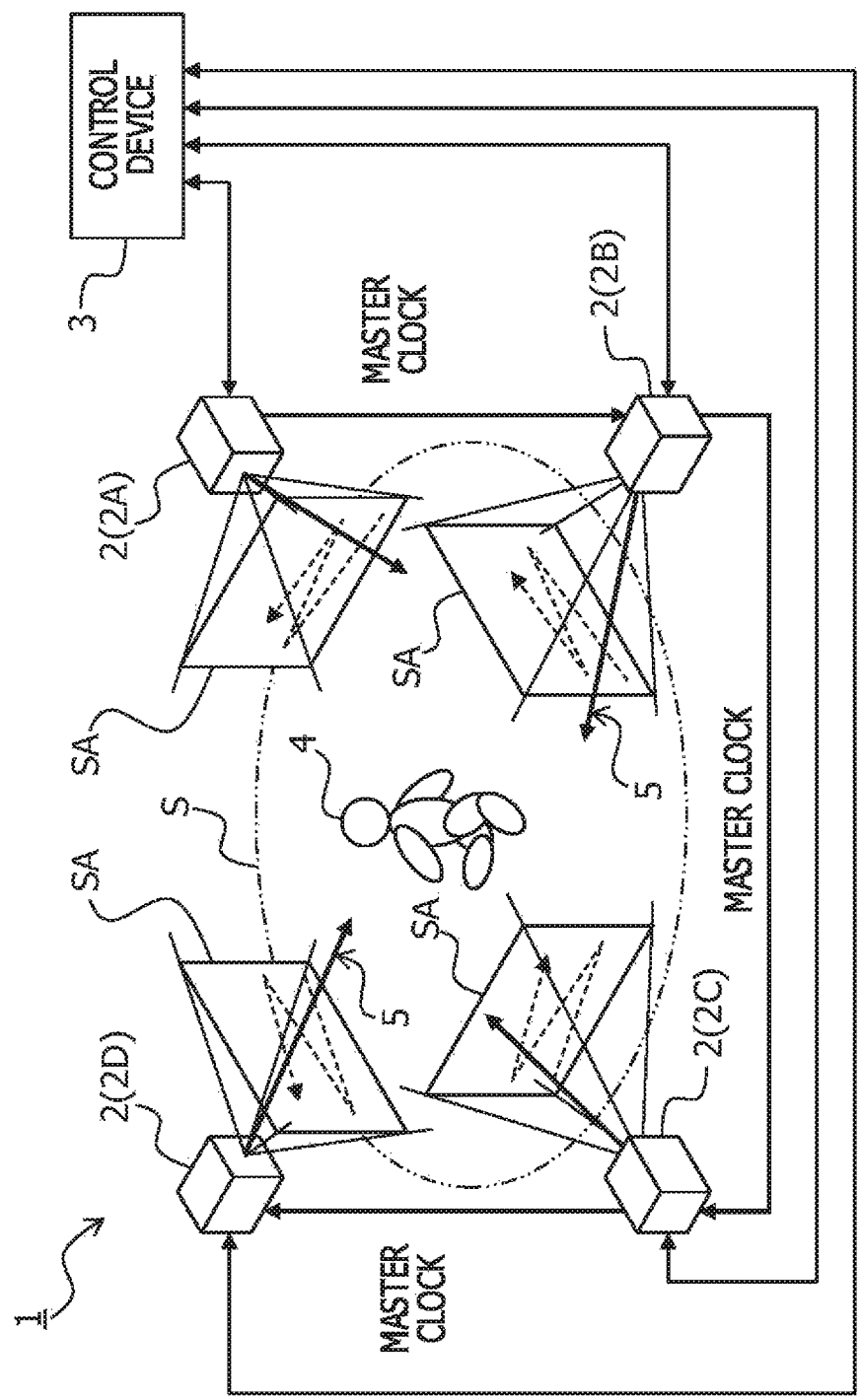
FIG. 1 is a diagram illustrating a configuration example of a distance measuring device according to a first embodiment.

FIG. 1 is a diagram illustrating a configuration example of a distance measuring device according to a first embodiment.

As illustrated in FIG. 1, a distance measuring device 1 according to the present embodiment includes a plurality of sensors 2 and a control device 3. In FIG. 1, the distance measuring device 1 including four sensors 2A to 2D is illustrated as one configuration example of the distance measuring device 1 according to the present embodiment.

Each of the plurality of sensors 2 emits a laser beam 5 generated by a laser beam source and detects a laser beam coming from the emission direction of the laser beam. The sensor 2 according to the present embodiment controls the emission direction of the laser beam by the MEMS mirror. Each of the plurality of sensors 2 controls the emission direction of the laser beam 5 so as to perform two-dimensional scanning within a predetermined measurement range SA.

The plurality of sensors 2 in the distance measuring device 1 of the present embodiment are disposed in such a manner that a distance to an object such as a person 4 or the like existing in a predetermined area S is measured from different directions. At this time, each of the plurality of sensors 2 is connected to the control device 3, and a measurement result of each sensor 2 is transmitted to the control device 3. Further, the plurality of sensors 2 in the distance measuring device 1 according to the present embodiment is in a line type network, and a sensor 2 (2A) located at one end of the network is set as a master sensor. The master sensor 2A generates a master clock that is a reference of a drive frequency of the MEMS mirror in each of the plurality of sensors 2. The master clock generated by the master sensor 2A is sequentially transferred to the other sensors 2B, 2C, and 2D. According to the master clock generated by the master sensor 2A, the plurality of sensors 2 control the operation of the MEMS mirror so that the scanning with the laser beam in the own sensor is synchronized with the scanning with the laser beam in other sensors.

The control device 3 controls the operation of each of the plurality of sensors 2. The control device 3 transmits a control signal including the frequency of the master clock to the master sensor 2A among the plurality of sensors 2. In addition, at each of a plurality of drive frequencies, the control device 3 collects information including a drive voltage of the MEMS mirror from each of the plurality of sensors 2 operating with a same drive frequency and determines the drive frequency of each sensor 2 at the time of distance measurement based on the collected information. Here, the information collected from each sensor 2 includes information indicating an upper limit value of a drive voltage or a drive voltage at which the MEMS mirror swings with a swing angle equal to or larger than a predetermined angle in a resonance direction (a direction in which the MEMS mirror swings with a drive frequency). Further, the control device 3 acquires the distance measurement result from each of the plurality of sensors 2 operating according to the master clock.

Figure 2:
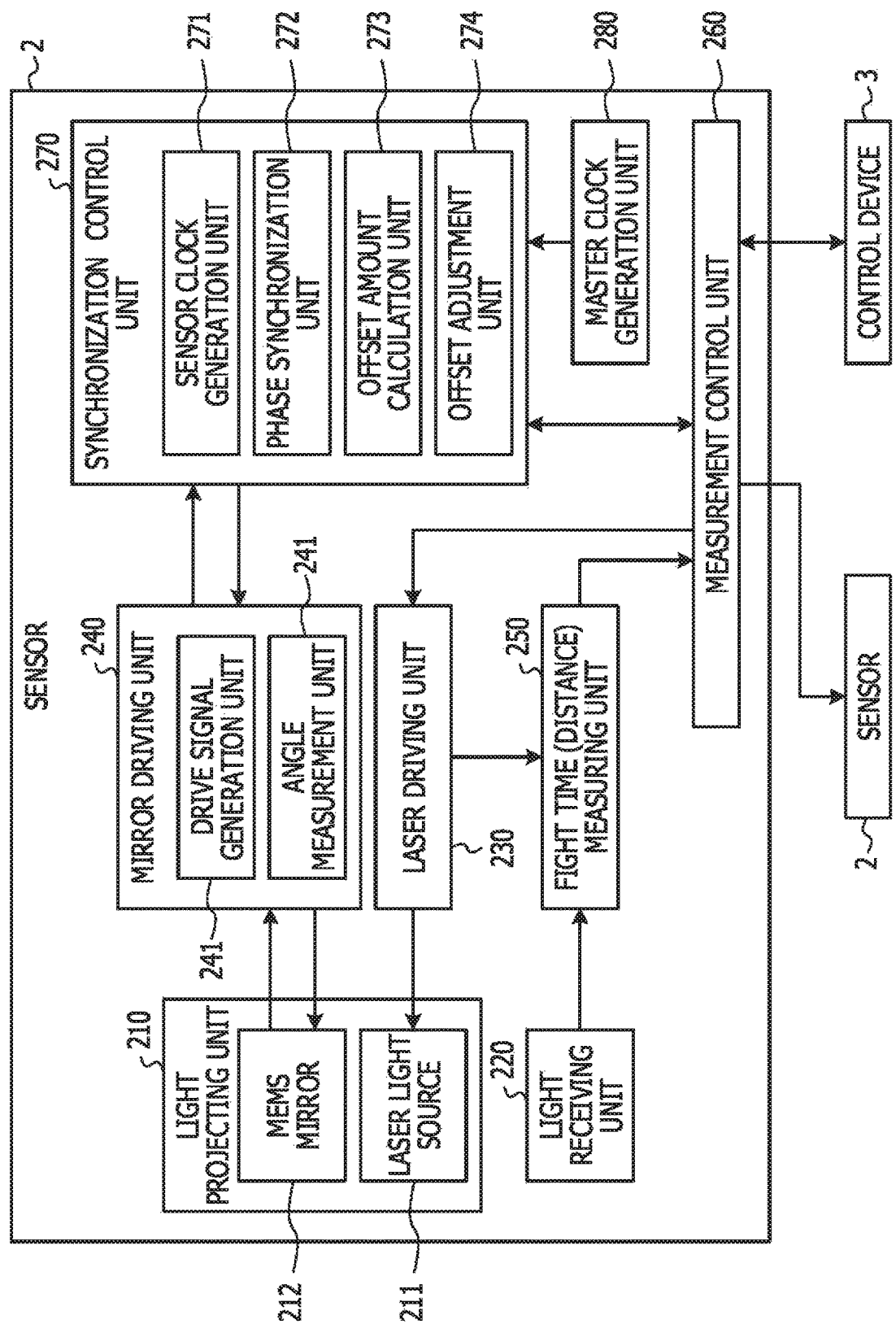
FIG. 2 is a diagram illustrating a functional configuration of a sensor in the distance measuring device according to the first embodiment.

FIG. 2 is a diagram illustrating a functional configuration of the sensor in the distance measuring device according to the first embodiment.

As illustrated in FIG. 2, the sensor 2 in the distance measuring device 1 of the present embodiment includes a light projecting unit 210, a light receiving unit 220, a laser driving unit 230, a mirror driving unit 240, a flight time (distance) measuring unit 250, and a measurement control unit 260. In addition, the sensor 2 further includes a synchronization control unit 270 and a master clock generation unit 280.

The light projecting unit 210 generates a laser beam to be used for measuring the distance to the object and emits the laser beam in a predetermined emission direction. The light projecting unit 210 includes the laser beam source 211 such as a laser diode and the MEMS mirror 212 that controls the emission direction of the laser beam.

The light receiving unit 220 receives the laser beam incident on the sensor 2 from the outside of the sensor 2 and outputs an electric signal corresponding to the intensity of the received laser beam.

The laser driving unit 230 drives the laser beam source 211. For example, the laser driving unit 230 generates a timing signal for controlling a light emission interval time and the like when emitting the pulse of the laser beam from the laser beam source 211 based on the control signal from the measurement control unit 260 and drives the laser beam source 211.

The mirror driving unit 240 drives the MEMS mirror 212. The mirror driving unit 240 generates a drive signal for controlling the direction of a reflection surface of the MEMS mirror 212 based on a signal from the synchronization control unit 270 and drives the MEMS mirror 212 with the drive signal. The mirror driving unit 240 includes a drive signal generation unit 241 and an angle measurement unit 242. The drive signal generation unit 241 generates a drive signal for driving the MEMS mirror 212. The angle measurement unit 242 measures an electrical signal such as a voltage corresponding to angle information indicating the direction of the reflection surface of the MEMS mirror 212.

The flight time (distance) measuring unit 250 measures the flight time of the laser beam (in other words, the time from the emission of a laser beam to hit an object and return to be received). The flight time (distance) measuring unit 250 measures the flight time of the laser beam based on an oscillation time (emission time) of the laser beam acquired from the laser driving unit 230 and the time when the light receiving unit 220 received the laser beam and calculates the distance to the object. In the following description, the flight time (distance) measuring unit 250 is also referred to as flight time measuring unit 250.

The measurement control unit 260 controls the operation relating to the measurement of the distance in the sensor 2. The measurement control unit 260 controls the operations of the laser driving unit 230 and the synchronization control unit 270 in accordance with the control signal from the control device 3. In addition, the measurement control unit 260 acquires the measurement result of the flight time measuring unit 250 and transmits the measurement result to the control device 3, and acquires the drive voltage of the drive signal generated by the mirror driving unit 240 via the synchronization control unit 270 and transmits the drive voltage to the control device. In addition, in a case where control signal from control device 3 contains information specifying the own sensor 2 as master sensor, the measurement control unit 260 causes the master clock generation unit 280 to generate a master clock. The measurement control unit 260 of the sensor 2 specified as the master sensor transfers the master clock generated by the master clock generation unit 280 to the other sensors 2. In addition, the measurement control unit 260 of the sensor 2 other than the sensor 2 specified as the master sensor inputs the master clock received from the latter sensor 2 to the synchronization control unit 270. In addition, the measurement control unit 260 of the sensor 2 other than the sensor 2 specified as the master sensor transfers the master clock to the former sensor 2 in a case where there is the former sensor 2.

Based on the master clock generated by the master clock generation unit 280 or the master clock transferred from the latter sensor 2, the synchronization control unit 270 synchronizes the operation of the mirror driving unit 240 of the own sensor 2 with the operations of the mirror driving unit 240 of the other sensors 2. The synchronization control unit 270 of the sensor 2 according to the present embodiment includes a sensor clock generation unit 271, a phase synchronization unit 272, an offset amount calculation unit 273, and an offset adjustment unit 274. Based on the measurement result of the amplitude (angle) in the resonance direction by the angle measurement unit 242 of the mirror driving unit 240, the sensor clock generation unit 271 generates a sensor signal (in-sensor clock) corresponding to a swing frequency in the resonance direction of the MEMS mirror 212. The phase synchronization unit 272 synchronizes the phase of the generated sensor signal with the phase of the master clock. The offset amount calculation unit 273 calculates the offset amount with respect to the phase of the sensor signal based on the measurement result of the angle of a non-resonance direction by the angle measurement unit 242 of the mirror driving unit 240. Here, the non-resonance direction is a direction orthogonal to the resonance direction. In addition, the offset amount of the phase is a phase shift amount of the sensor signal caused by the angle change to the non-resonance direction of the emission direction of the laser beam. The offset adjustment unit 274 adjusts the phase of the sensor signal to be output to the mirror driving unit 240 based on the calculated offset amount.

As described above, the master clock generation unit 280 generates a master clock based on information indicating the frequency of the master clock included in the control signal from the control device 3.

Figure 3:
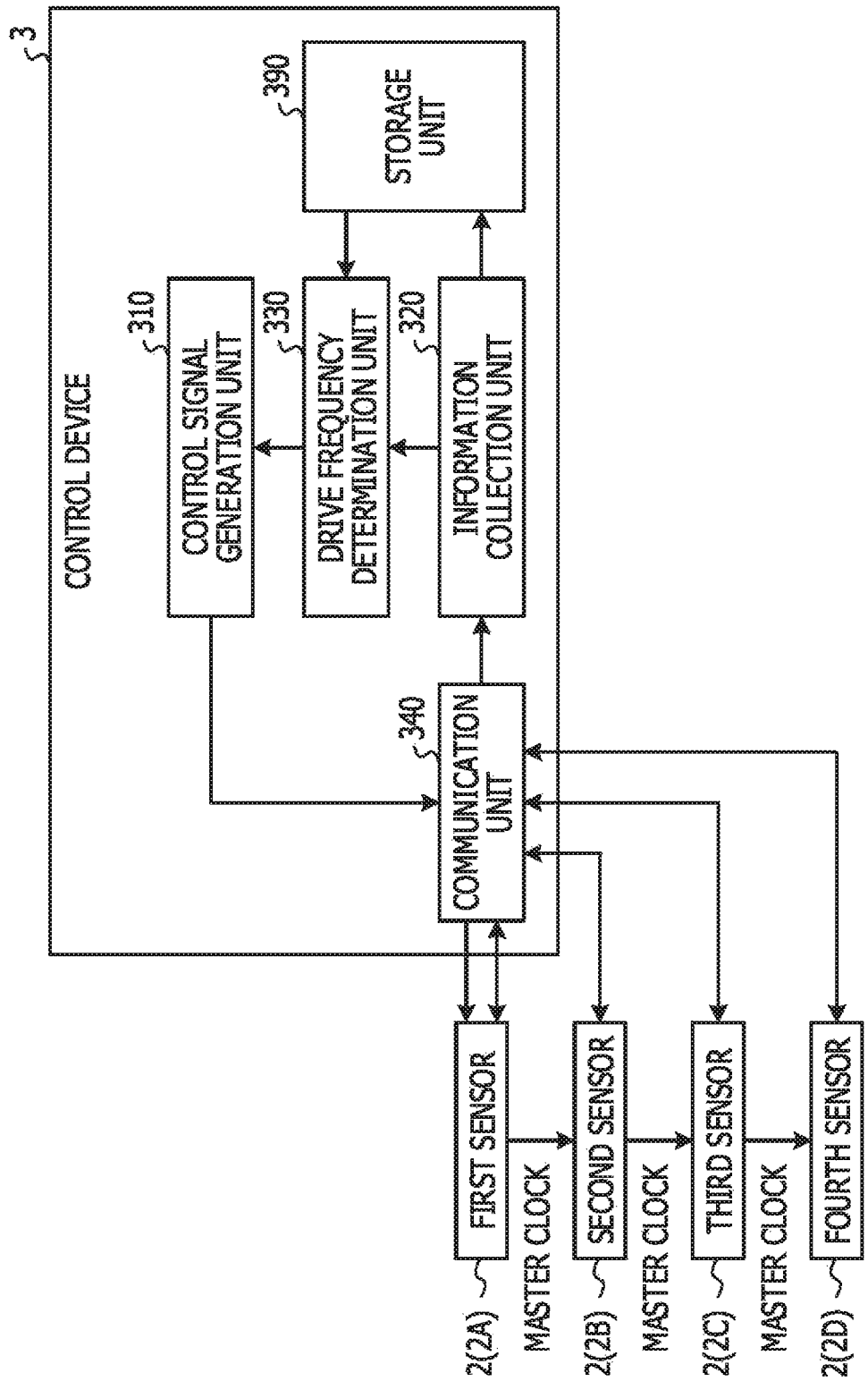
FIG. 3 is a diagram illustrating a functional configuration of a control device in the distance measuring device according to the first embodiment.

FIG. 3 is a diagram illustrating a functional configuration of the control device in the distance measuring device according to the first embodiment.

As illustrated in FIG. 3, the control device 3 in the distance measuring device 1 according to the present embodiment includes a control signal generation unit 310, an information collection unit 320, a drive frequency determination unit 330, a communication unit 340, and a storage unit 390.

The control signal generation unit 310 generates various control signals for controlling the operation of each sensor 2. The control signal generated by the control signal generation unit 310 includes information indicating the frequency of the master clock and information specifying a process to be performed by each sensor 2. Information indicating the frequency of the master clock is transmitted only to the sensor 2 specified as the master sensor. The information specifying a process performed by each sensor 2 includes information specifying which of a pre-process for determining drive frequency and a distance measurement process is performed. While performing the pre-process to determine the drive frequency, the control signal generation unit 310 generates a control signal including information indicating a frequency selected from within a predetermined frequency range as a control signal including information indicating the frequency of the master clock. In addition, when starting the distance measurement process, the control signal generation unit 310 generates a control signal including information indicating the frequency determined by the drive frequency determination unit 330 as a control signal including information indicating the frequency of the master clock.

The information collection unit 320 collects the result of a process performed in the sensor 2 from each sensor 2. In a case where each sensor 2 is caused to perform the pre-process for determining the drive frequency, the information collection unit 320 acquires information on the drive voltage when the MEMS mirror 212 is driven at the drive frequency corresponding to the frequency of the master clock from the sensors 2. In a case where each sensor 2 is performing the distance measurement process, the information collection unit 320 acquires the distance measurement result from each sensor 2. The information collection unit 320 stores the process result acquired from each sensor 2 in the storage unit 390. In the present embodiment, the information collected by the information collection unit 320 from each sensor 2 during the pre-process of each sensor 2 is set as the drive voltage of the MEMS mirror 212. However, the information collected by the information collection unit 320 during the pre-process of each sensor 2 is not limited to the drive voltage of the MEMS mirror 212, but may be electric power or the like.

The drive frequency determination unit 330 reads information indicating the relationship between the drive frequency and the drive voltage of the MEMS mirror 212 acquired by causing each sensor 2 to perform the pre-process from the storage unit 390 and determines the drive frequency at which the sum of the drive power of the sensors 2 is minimized. In the present description, the electric power is minimized, but the reference can be arbitrarily set.

The communication unit 340 transmits the control signal generated by the control signal generation unit 310 to each of the plurality of sensors 2 (first sensor 2A to fourth sensor 2D). In addition, the communication unit 340 transmits a control signal including information indicating the frequency of the master clock to the sensor 2 (2A) specified as the master. Further, the communication unit 340 receives a process result from each of the plurality of sensors 2.

The storage unit 390 stores the process result (collected information) acquired from the plurality of sensors 2.

Figure 4A:
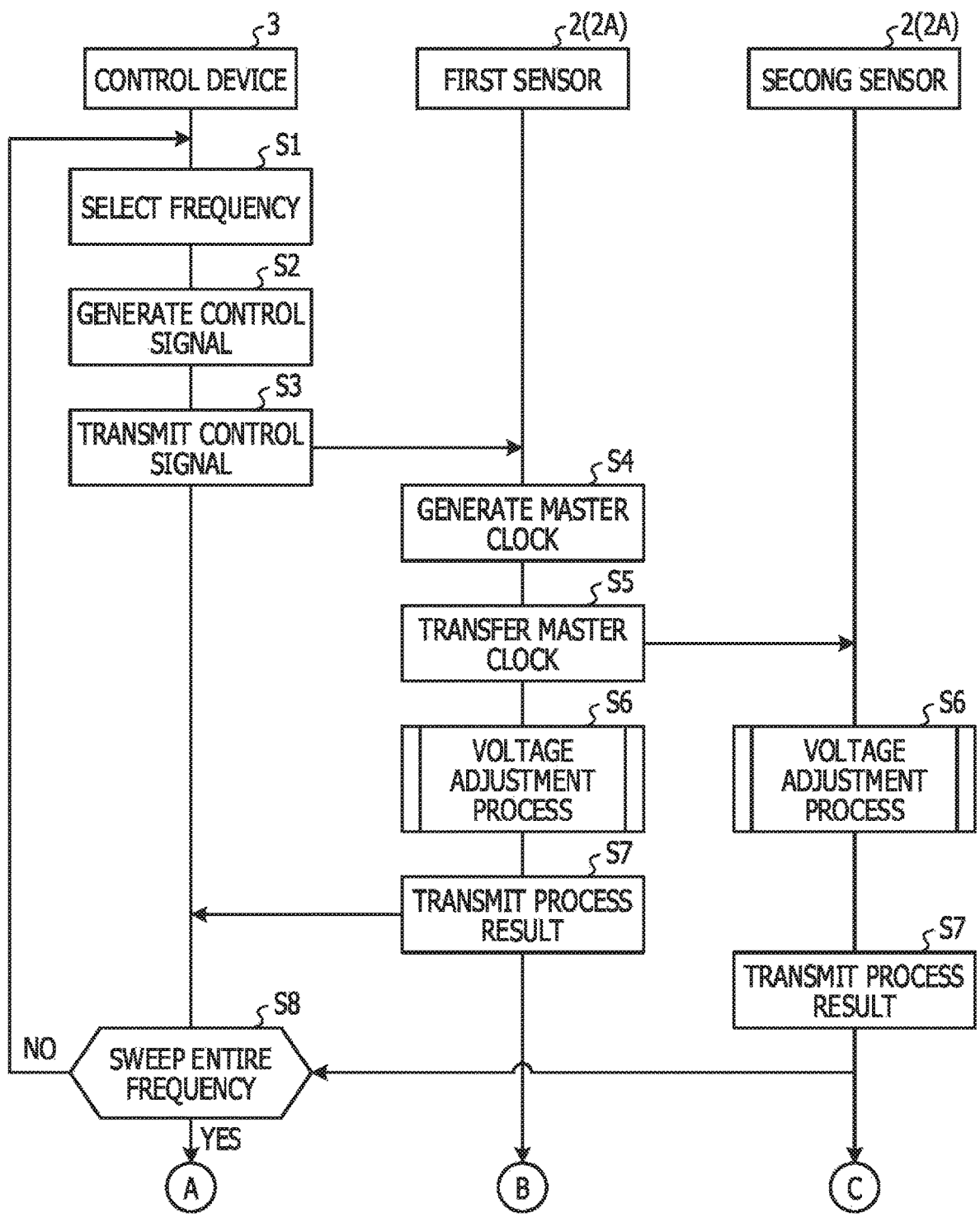
FIG. 4A is a sequence diagram (part 1) for explaining a process performed by the distance measuring device according to the first embodiment.
Figure 4B:
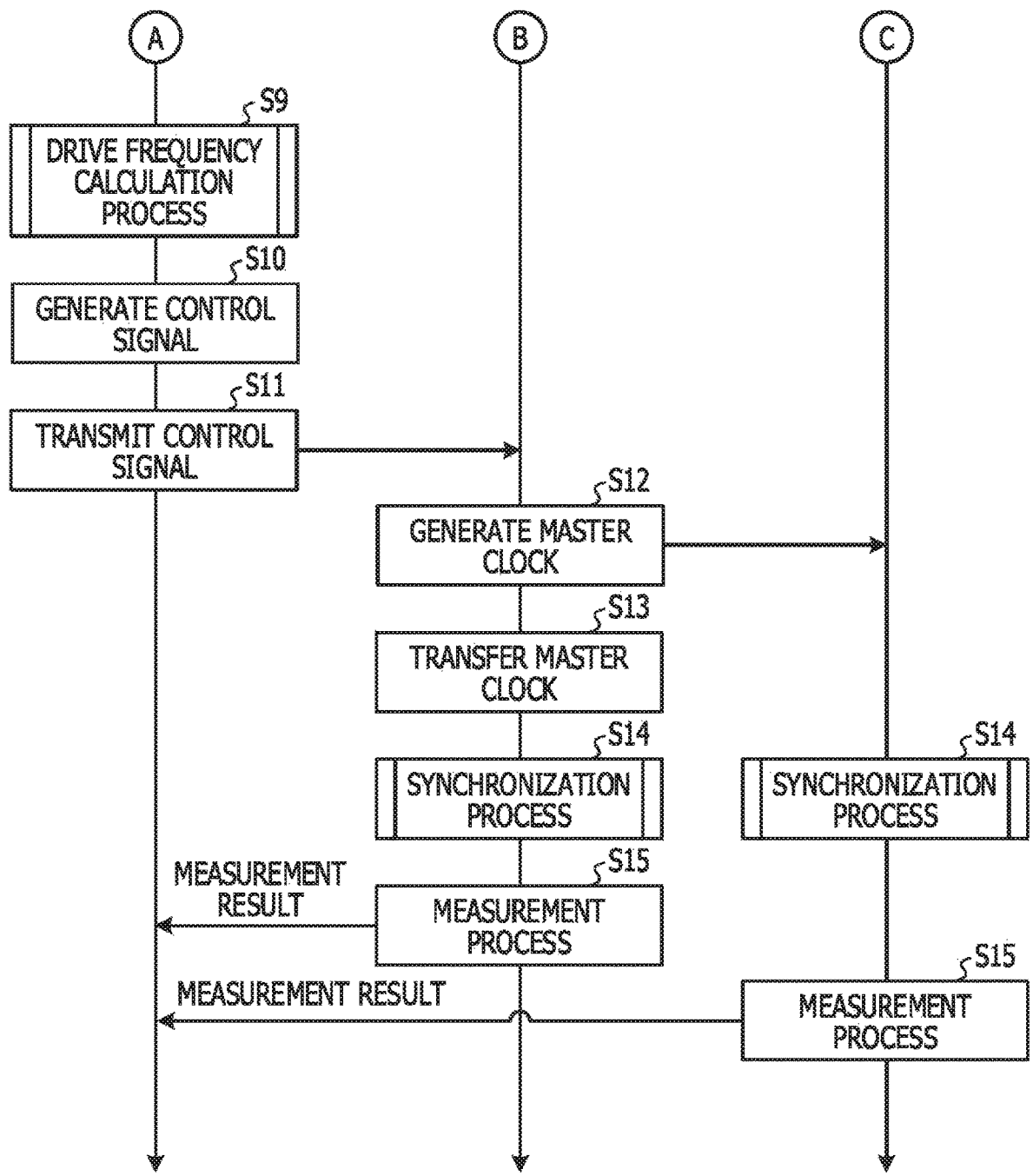
FIG. 4B is a sequence diagram (part 2) for explaining the process performed by the distance measuring device according to the first embodiment.

FIG. 4A is a sequence diagram (part 1) for explaining a process performed by the distance measuring device according to the first embodiment. FIG. 4B is a sequence diagram (part 2) for explaining a process performed by the distance measuring device according to the first embodiment. FIGS. 4A and 4B illustrate the contents of the process by the first sensor 2A as the master sensor in the distance measuring device 1 including two sensors 2, a first sensor 2A, and a second sensor 2B.

In the distance measuring device 1 according to the present embodiment, first, as illustrated in FIG. 4A, the control device 3 selects the frequency of the master clock (step S1) and generates a control signal including information indicating the selected frequency and information indicating that the pre-process is to be performed (step S2). The process in steps S1 and S2 is performed by the control signal generation unit 310 of the control device 3. The control signal generation unit 310 selects the frequency of the master clock in accordance with a predetermined selection rule from the predetermined frequency range based on a design value of the resonance frequency of the MEMS mirror 212 in the first sensor 2A and the second sensor 2B.

After generating the control signal, the distance measuring device 1 transmits the generated control signal to the first sensor 2A (step S3). The process of step S3 is performed by the communication unit 340 of the distance measuring device 1. The communication unit 340 transmits the control signal generated in step S2 to the first sensor 2A specified as the master sensor. Upon completion of the process of step S3, the control device 3 enters a standby state until receiving the process result from each sensor 2.

Upon receiving the control signal from the control device 3, the first sensor 2A generates a master clock based on the control signal (step S4) and transfers the generated master clock to the second sensor 2B (step S5). The process of step S4 is performed by the master clock generation unit 280 of the first sensor 2A. The process of step S5 is performed, for example, by the measurement control unit 260 of the first sensor 2A.

After transferring the master clock to the second sensor 2B, the first sensor 2A performs a voltage adjustment process (step S6) using the generated master clock and transmits the process result to the control device 3 (step S7). Similarly, the second sensor 2B that has received the master clock from the first sensor 2A performs the voltage adjustment process (step S6) using the generated master clock and transmits the process result to the control device 3 (step S7). In the voltage adjustment process of step S6, the first sensor 2A and the second sensor 2B respectively adjust the drive voltage so that the swing angle in the resonance direction when the MEMS mirror 212 is driven at the frequency of the master clock as the drive frequency becomes equal to or larger than the predetermined angle. In addition, in the present embodiment, in a case where the upper limit value is set for the drive voltage and the swing angle in the resonance direction of the MEMS mirror 212 is less than the predetermined angle even if the drive voltage is increased to the upper limit value, it is assumed that the upper limit value of the drive voltage is a value of the drive voltage with respect to the current drive frequency. In step S7, the first sensor 2A and the second sensor 2B respectively transmit the result of the voltage adjustment process (drive voltage) to the control device 3. At this time, in the first sensor 2A and the second sensor 2B, respectively, the measurement control unit 260 acquires the drive voltage of the MEMS mirror via the synchronization control unit 270 and transmits the drive voltage to the control device 3.

The control device 3 that has received the result of the voltage adjustment process from the first sensor 2A and the second sensor 2B stores the received process result in the storage unit 390 in association with the drive frequency and then determines whether or not the entire frequency is swept (step S8). In a case where there is a frequency that is not selected in step S1 among the frequencies selectable within the predetermined frequency range (step S8: NO), the control device 3 performs the processes in steps S1 to S3 and acquires (collects) the result of the voltage adjustment process from the first sensor 2A and the second sensor 2B.

In a case where the result of the voltage adjustment process is acquired from the first sensor 2A and the second sensor 2B at all frequencies selectable within the predetermined frequency range (step S8: YES), then, as illustrated in FIG. 4B, control device 3 performs a drive frequency determination process (step S9). The process of step S9 is performed by the drive frequency determination unit 330 of the control device 3. The drive frequency determination unit 330 calculates the sum of the drive power based on the drive voltages of the first sensor 2A and the second sensor 2B for each drive frequency and determines the drive frequency at which the sum of the drive power is the minimum value as the drive frequency of the MEMS mirror 212 at the time of distance measurement.

When the control device 3 ends the drive frequency determination process in step S9, the pre-process in the distance measuring device 1 ends. When the pre-process is ended, the distance measuring device 1 starts a process to measure the distance to the object.

When the distance measurement process is started, first, the control device 3 generates a control signal having the frequency of the master clock as the drive frequency determined in step S9 (step S10) and transmits the generated control signal to the first sensor 2A (step S11). The process in step S10 is performed by the control signal generation unit 310 of the control device 3. In step S10, the control signal generation unit 310 generates a control signal including information indicating the drive frequency determined in step S9, and information indicating that the distance measurement process is performed. When the process of step S11 is ended, the control device 3 enters a standby state until the control device 3 receives the process result from each sensor 2.

Upon receiving the control signal from the control device 3, the first sensor 2A generates a master clock based on the control signal (step S12) and transfers the generated master clock to the second sensor 2B (step S13). The process of step S12 is performed by the master clock generation unit 280 of the first sensor 2A.

After transferring the master clock to the second sensor 2B, the first sensor 2A performs a synchronization process (step S14) using the generated master clock and the measurement process (step S15) and transmits the result of the measurement process to the control device 3. Similarly, the second sensor 2B that has received the master clock from the first sensor 2A performs the synchronization process (step S14) using the received master clock and the measurement process (step S15) and transmits the result of the measurement process to the control device 3. In the synchronization process of step S14, the first sensor 2A and the second sensor 2B respectively adjust the drive voltage so that the swing angle in the resonance direction when the MEMS mirror 212 is driven at the frequency of the master clock as the drive frequency becomes equal to or larger than the predetermined angle. In addition, in the present embodiment, in a case where the upper limit value is set for the drive voltage and the swing angle in the resonance direction of the MEMS mirror 212 is less than the predetermined angle even if the drive voltage is increased to the upper limit value, it is assumed that the upper limit value of the drive voltage is the value of the drive voltage of the MEMS mirror 212. Further, in step S14, the first sensor 2A and the second sensor 2B respectively synchronize the phase of the sensor clock generated based on a swing cycle of the MEMS mirror 212 driven at the frequency and the voltage determined by the above process with the phase of the master clock.

Thereafter, although not illustrated, the first sensor 2A and the second sensor 2B respectively repeat the synchronization process S14 and the measurement process S15 until receiving the control signal including information indicating that the measurement process is to be ended from the control device 3.

As described above, in the distance measuring device 1 according to the present embodiment, a pre-process is performed to determine the drive frequency of the MEMS mirror of each sensor 2 before the distance measurement is started by the plurality of sensors 2. In the pre-process, each of the plurality of sensors 2 performs the voltage adjustment process (step S6) for adjusting the drive voltage in case of driving the MEMS mirror 212 with the drive frequency based on the master clock. As the voltage adjustment process in step S6, each sensor 2 performs, for example, the process illustrated in FIG. 5.

Figure 5:
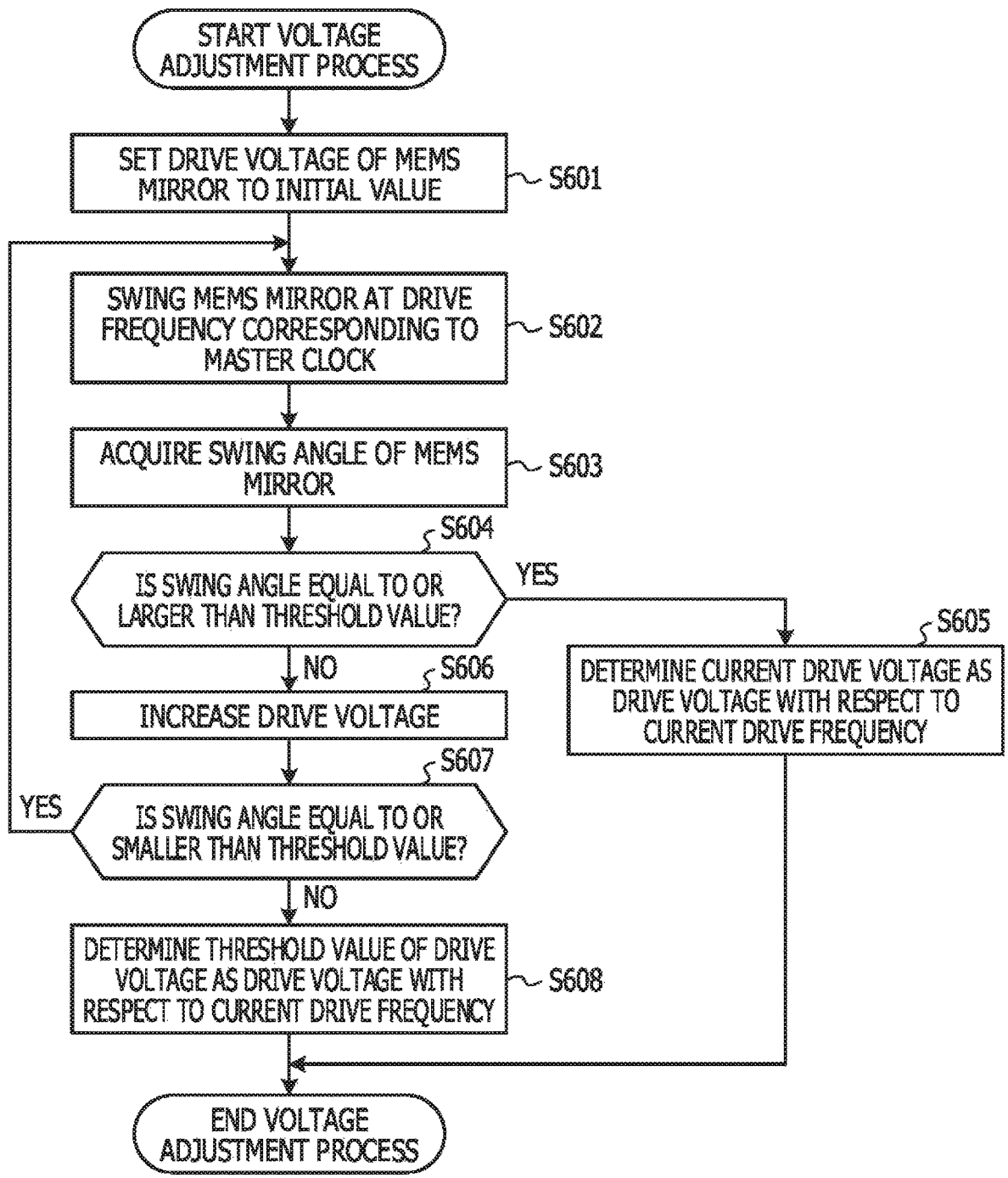
FIG. 5 is a flowchart for explaining contents of a voltage adjustment process performed by each sensor.

FIG. 5 is a flowchart for explaining contents of the voltage adjustment process performed by each sensor. When the voltage adjustment process is started, the sensor 2 first sets the drive voltage of the MEMS mirror 212 to an initial value (step S601). The process of step S601 is performed by, for example, the drive signal generation unit 241 of the mirror driving unit 240 of the sensor 2.

Next, the sensor 2 swings the MEMS mirror with the drive frequency corresponding to the master clock (step S602). The process of step S602 is performed by the synchronization control unit 270 and the drive signal generation unit 241 of the mirror driving unit 240. The synchronization control unit 270 inputs the master clock to the drive signal generation unit 241 of the mirror driving unit 240. The drive signal generation unit 241 uses the frequency of the master clock as the drive frequency of the MEMS mirror 212 and drives the MEMS mirror 212 with a currently set drive voltage.

Next, the sensor 2 acquires the swing angle of the MEMS mirror 212 (step S603). The process of step S603 is performed by the angle measurement unit 242 of the mirror driving unit 240. The angle measurement unit 242 acquires the swing angle of the MEMS mirror 212 based on the change amount of the angle of the MEMS mirror 212 with respect to the resonance direction when the MEMS mirror 212 is driven at the resonance frequency.

Next, the sensor 2 determines whether or not the swing angle of the MEMS mirror 212 is equal to or larger than a threshold value (step S404). The determination in step S404 is performed by, for example, the angle measurement unit 242 of the mirror driving unit 240. The threshold of the swing angle is set, for example, based on the swing angle with respect to the resonance direction when the MEMS mirror 212 is driven at the resonance frequency. The threshold value of the swing angle is arbitrary and may be a swing angle with respect to the resonance direction when the MEMS mirror 212 is driven at the resonance frequency and the drive voltage or may be about 80 to 90% of the maximum value of the swing angle.

In a case where the swing angle of the MEMS mirror 212 is equal to or larger than the threshold value (step S604: YES), the sensor 2 determines a current drive voltage as a drive voltage with respect to the current drive frequency (step S605). The process of step S605 is performed by, for example, the drive signal generation unit 241 of the mirror driving unit 240. When the drive voltage is determined in step S605, the sensor 2 ends the voltage adjustment process and transmits the process result including the determined drive voltage to the control device 3.

On the other hand, in a case where the swing angle of the MEMS mirror 212 is smaller than the threshold (step S604: NO), then, the sensor 2 increases the drive voltage by a predetermined potential (step S606) and determines whether or not the increased drive voltage is equal to or less than a threshold value (step S607). The process in steps S606 and S607 is performed by the drive signal generation unit 241 of the mirror driving unit 240. In a case where the increased drive voltage is equal to or less than the threshold value (step S607: YES), the mirror driving unit 240 of the sensor 2 repeats the processes from step S602 onward.

On the other hand, in a case where the increased drive voltage is higher than the threshold value (step S607: NO), the sensor 2 determines the threshold value (upper limit value) of the drive voltage as a drive voltage with respect to the current drive frequency (step S608). The process of step S608 is performed by, for example, the drive signal generation unit 241 of the mirror driving unit 240. When the drive voltage is determined in step S608, the sensor 2 ends the voltage adjustment process and transmits the process result including the determined drive voltage to the control device 3.

In the distance measuring device 1 according to the present embodiment, each sensor 2 performs the process illustrated in FIG. 5 at each of the plurality of drive frequencies and transmits the determined drive voltage to the control device 3. Then, when the drive voltage determined by each sensor 2 with respect to all frequencies selectable within the predetermined frequency range is acquired, the control device 3 performs the drive frequency determination process (step S9). As the drive frequency determination process, control device 3 performs the process illustrated in FIG. 6, for example.

Figure 6:
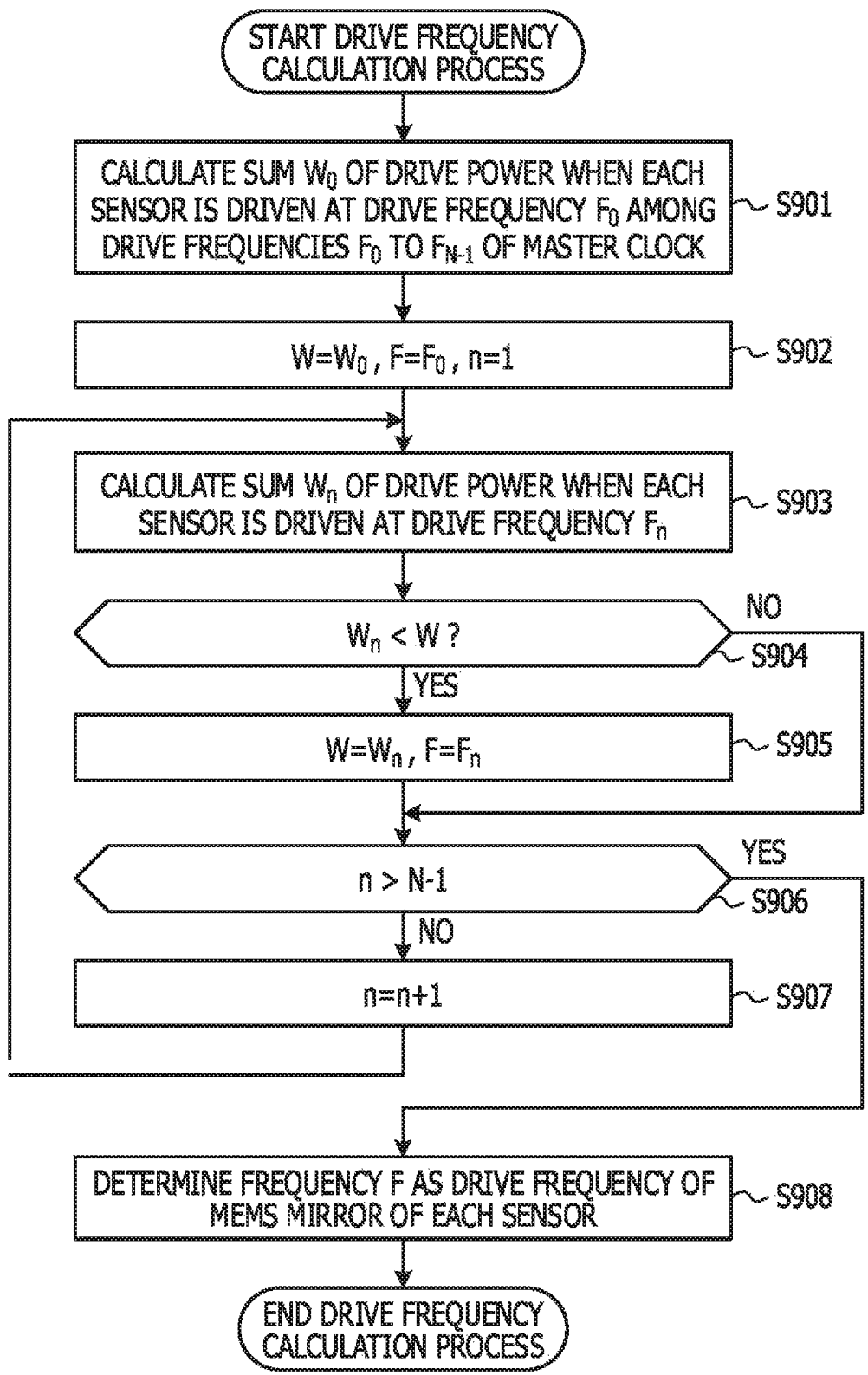
FIG. 6 is a flowchart for explaining contents of a drive frequency determination process.

FIG. 6 is a flowchart for explaining contents of the drive frequency determination process.

The drive frequency determination process of FIG. 6 is performed by the drive frequency determination unit 330 of the control device 3. When the drive frequency determination process is started, the drive frequency determination unit 330 first calculates a sum W0 of the drive power when each sensor is driven at a drive frequency F0 among drive frequencies F0 to FN−1 (step S901).

Next, the drive frequency determination unit 330 sets a minimum value W of the sum of the drive power and a drive frequency F at which the sum of the drive power becomes minimum to W=W0 and F=F0 respectively, and sets a variable n to 1 (step S902).

Next, the drive frequency determination unit 330 calculates the sum of drive power Wn when driving each sensor 2 with a drive frequency Fn (step S903) and determines whether or not Wn<W (S904). In a case where Wn<W (step S904: YES), the drive frequency determination unit 330 updates the minimum value W of the sum of the drive power and the drive frequency F at which the sum of the drive power becomes minimum to W=Wn and F=Fn, respectively (step S905).

In a case where Wn is greater than or equal to W (step S904: NO) or in a case where the process of step S905 is performed, the drive frequency determination unit 330 then determines whether or not the variable n is n>N+1 (step S906). In a case where n<N−1 (step S906: NO), the drive frequency determination unit 330 updates the variable n to n+1 (step S907) and repeats the processes from step S903 onward.

Then, in a case where the variable n becomes greater than or equal to N+1 (step S906: YES), the drive frequency determination unit 330 determines the drive frequency F at which the sum of the drive power is the minimum value W as the drive frequency of the MEMS mirror of each sensor (step S908). The drive frequency determination unit 330 notifies the control signal generation unit 310 of the drive frequency determined in step S908 and ends the drive frequency determination process.

After determining the drive frequency of each sensor 2 in step S9, the control device 3 generates a control signal indicating that the distance measurement process is performed by driving the MEMS mirror with the master clock of the determined drive frequency and transmits the control signal to the first sensor 2A (steps S10 and S11). The first sensor 2A generates a master clock based on the control signal received from the control device 3 and transfers the generated master clock to the second sensor 2B (steps S12 and S13). Thereafter, the first sensor 2A and the second sensor 2B respectively measure the distance while driving the MEMS mirror 212 with the drive frequency corresponding to the master clock (steps S14 and S15). At this time, each sensor 2 performs a synchronization process (step S14) for synchronizing the operation of the MEMS mirror 212. The synchronization process is performed by the mirror driving unit 240 and the synchronization control unit 270 of each sensor 2. The mirror driving unit 240 and the synchronization control unit 270 of the sensor 2 perform, for example, the process illustrated in FIG. 7 as the synchronization process.

FIG. 7 is a flowchart for explaining contents of the synchronization process performed by each sensor.

When the synchronization process is started, the sensor 2 first drives the MEMS mirror 212 with a drive frequency corresponding to the master clock (step S1401). The process in step S1401 is performed by the mirror driving unit 240 of the sensor 2. At this time, the synchronization control unit 270 outputs the master clock to the drive signal generation unit 241 of the mirror driving unit 240 as the sensor clock. The drive signal generation unit 241 generates a drive signal for the MEMS mirror 212 based on the frequency and the phase of the master clock and outputs the drive signal to the MEMS mirror 212.

Next, the sensor 2 adjusts the drive voltage so that the swing angle of the MEMS mirror 212 becomes the predetermined angle (step S1402). The process of step S1402 is performed by the mirror driving unit 240. As the process in step S1402, the mirror driving unit 240 performs, for example, the voltage adjustment process in steps S601 to S608 illustrated in FIG. 5.

Next, the sensor 2 acquires the sensor clock based on the swing cycle of the MEMS mirror 212 (step S1403). The step S1403 is performed by the angle measurement unit 242 of the mirror driving unit 240 and the sensor clock generation unit 271 of the synchronization control unit 270. The angle measurement unit 242 measures the swing angle of the MEMS mirror 212 with respect to the resonance direction when the MEMS mirror 212 is operated at the resonance frequency and outputs a sine wave indicating the temporal change of the swing angle to the synchronization control unit 270. In the sensor clock generation unit 271, the synchronization control unit 270 converts a sine wave indicating the temporal change of the swing angle into a rectangular wave (sensor clock) having the same frequency as the sine wave.

Next, the sensor 2 synchronizes the phase of the sensor clock with the phase of the master clock (step S1404). The process of step S1404 is performed by the phase synchronization unit 272 of the synchronization control unit 270. The phase synchronization unit 272 adjusts the phase of the drive signal by a phase locked loop (PLL) or the like so that the phase of the sensor dock is synchronized with the phase of the master clock.

Next, the sensor 2 performs offset adjustment of the phase of the sensor signal (step S1405). The process in step S1405 is performed by the offset amount calculation unit 273 and the offset adjustment unit 274 of the synchronization control unit 270. The offset amount calculation unit 273 calculates the offset amount of the phase with respect to the sensor clock in which the phase is synchronized with the master clock based on the angle in the non-resonance direction of the MEMS mirror 212. In addition, the offset adjustment unit 274 performs offset adjustment on the phase of the sensor signal based on the calculated offset amount. When the offset adjustment unit 274 outputs the sensor signal after the offset adjustment to the mirror driving unit 240, the synchronization process ends.

After the synchronization process is ended, each sensor 2 performs the distance measurement process (step S15) while driving the MEMS mirror 212 based on the sensor clock obtained by the synchronization process. For example, each sensor 2 measures the distance to the object by scanning with the laser beam in the horizontal direction as the resonance direction. At this time, for example, every time scanning with the laser beam in the horizontal direction is ended once, each sensor 2 performs the synchronization process of FIG. 7 to synchronize the phase of the sensor signal with the phase of the master clock and further generates a sensor signal which is obtained by the offset adjustment based on the shift amount in the non-resonance direction.

In this way, the distance measuring device 1 according to the present embodiment checks the relationship between the drive voltage and the swing angle when the MEMS mirror of each sensor is driven at each of a plurality of drive frequencies and determines the drive frequency at which the swing angle is large and the sum of the drive power is minimum. In addition, in the present embodiment, the MEMS mirror 212 in each sensor 2 is driven by the drive frequency corresponding to the master clock generated by one sensor 2 specified as the master sensor among the plurality of sensors 2. Therefore, even in a case where the resonance frequencies of the MEMS mirrors 212 in the respective sensors are different from each other, it is possible to easily synchronize the measurement operation of each sensor 2 in a state in which a sufficient measurement range secured. Therefore, according to the present embodiment, it is possible to synchronize the distance measuring operations in each sensor 2 with high accuracy and simultaneously measure the distance to one (or one set) of objects from a plurality of directions.

Figure 8A:
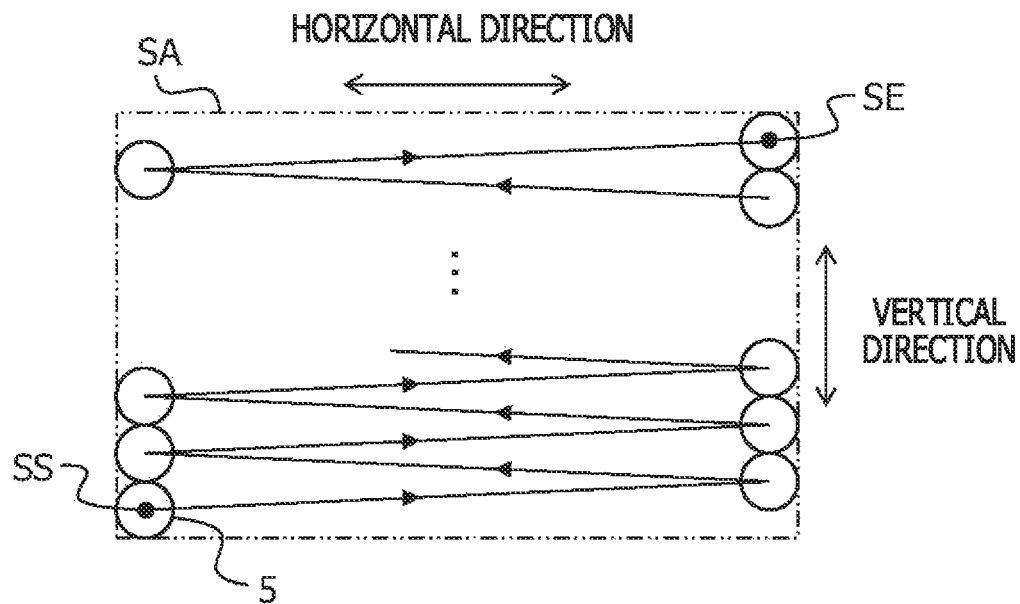
FIG. 8A and FIG. 8B are diagrams for explaining a temporal change in an emission direction of a laser beam.
Figure 8B:
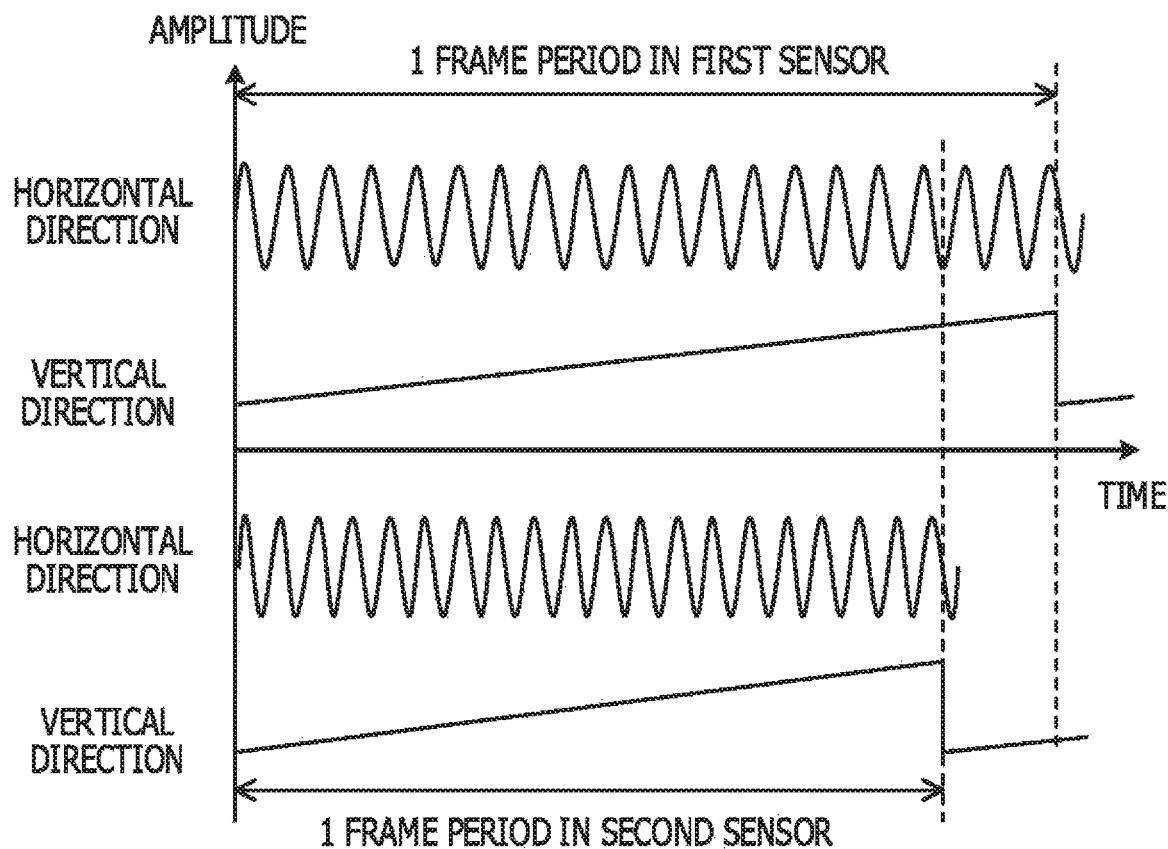

FIGS. 8A and 8B are diagrams for explaining a temporal change in the emission direction of the laser beam.

In case of measuring the distance to the object using the laser beam, as illustrated in FIG. 8A, the emission direction of the laser beam 5 is scanned within the measurement range SA. In the example illustrated in FIG. 8A, while setting the lower left corner portion of the rectangular measurement range SA as a scanning start point SS and swinging the emission direction of the laser beam 5 in the horizontal direction (first direction), the angle in the vertical direction (second direction) is changed upward. When the emission direction of the laser beam 5 reaches the upper right corner portion (scanning end point SE) in the measurement range SA, the sensor 2 ends scanning for one frame. Thereafter, the sensor 2 changes the emission direction of the laser beam 5 in the direction of the scanning start point SS and starts scanning for the next one frame.

In case of scanning with the laser beam 5 in the emission direction in the procedure illustrated in FIG. 8A, the sensor 2 utilizes a resonance phenomenon of the MEMS, for example, for controlling the emission direction in the horizontal direction. By swinging the MEMS with the MEMS resonance frequency as the drive frequency, it is possible to change the emission direction of the laser beam in the horizontal plane at high speed and widen an angle range of the emission direction of the laser beam.

However, the resonance frequency of the MEMS mirror 212 has individual differences due to variations in dimensions caused according to the processing accuracy at the time of manufacturing. Therefore, in case of performing raster scan using resonance in horizontal scanning by MEMS with each of a plurality of sensors, a difference occurs in the scanning speed in the horizontal direction of each sensor. Therefore, in case of performing raster scan using resonance in the horizontal scanning by the MEMS with each of the plurality of sensors, for example, as illustrated in FIG. 8B, a time difference occurs between one frame period (frame rate) of the first sensor 2A and one frame period of the second sensor 2B. Here, the frame rate is the time taken to scan the laser beam 5 from the scanning start point SS to the scanning end point SE in the sensor 2 and return to the scanning start point SS.

As described above, in a case where the MEMS mirror 212 of each sensor 2 is driven at the resonance frequency, the time taken for the measurement in the measurement range is different, and thus it is difficult to measure the distance to one or a set of objects simultaneously from a plurality of directions. Therefore, in order to simultaneously measure the distance to one or a set of objects from a plurality of directions, in the present embodiment, the MEMS mirror 212 of each sensor 2 are driven at the same drive frequency.

Figure 9A:
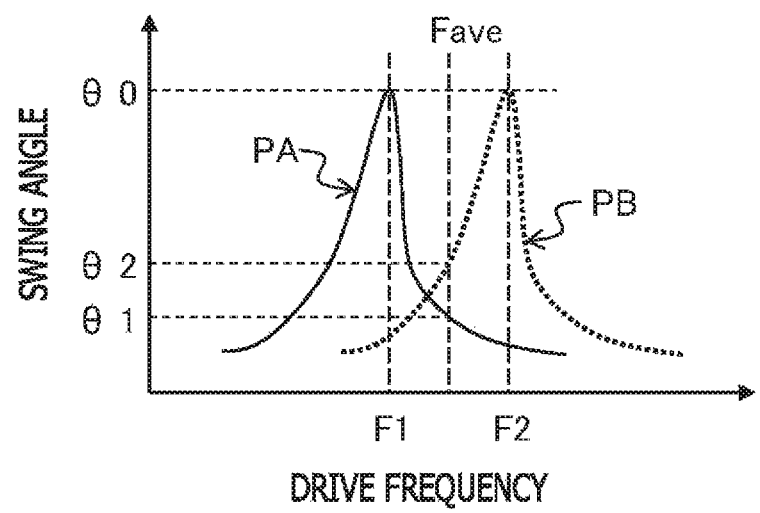
FIG. 9A and FIG. 9B are diagrams illustrating a relationship between a drive frequency and a swing angle of a MEMS mirror.
Figure 9B:
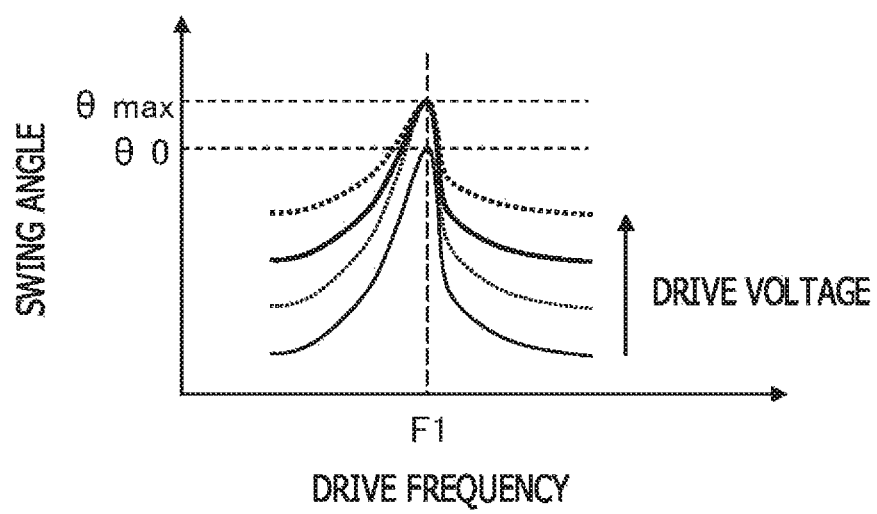

FIGS. 9A and 9B are diagrams illustrating a relationship between the drive frequency and the swing angle of the MEMS mirror.

FIG. 9A illustrates a curve PA illustrating a relationship between the drive frequency and the swing angle for the MEMS mirror 212 of the first sensor 2A, and a curve PB illustrating a relationship between the drive frequency and the swing angle for the MEMS mirror 212 of the second sensor 2B.

There is the following relationship between the drive frequency and the swing angle in the MEMS mirror 212. In a case where the drive voltage is regular, the swing angle decreases when the MEMS mirror 212 is driven at the resonance frequency, the swing angle becomes the maximum value, and the difference between the drive frequency and the resonance frequency increases. That is, in the example illustrated in FIG. 9A, the resonance frequency for the MEMS mirror 212 of the first sensor 2A is a drive frequency F1, and the resonance frequency for the MEMS mirror 212 of the second sensor 2B is a drive frequency F2 (>F1). Therefore, in a case where the MEMS mirror 212 of the first sensor 2A and the MEMS mirror 212 of the second sensor 2B are driven at the resonance frequency, as illustrated in FIG. 8B, a time difference occurs in one frame period, and the distance to the object may not be simultaneously measured.

In addition, in a case where the MEMS mirror 212 of the first sensor 2A and the MEMS mirror 212 of the second sensor 2B are driven at the same frequency (for example, average value Fave of resonance frequencies), the swing angle of each MEMS mirror 212 is smaller than the maximum value.

On the other hand, for example, in a case where the MEMS mirror 212 of the first sensor 2A and the MEMS mirror 212 of the second sensor 2B are driven at the same drive frequency of the MEMS mirror 212 of one sensor 2A by changing the drive voltage, the relationship between the drive frequency and the swing angle is as illustrated in FIG. 9B. That is, in a case where the drive frequency is regular, it is possible to increase the swing angle by increasing the drive voltage. A swing angle θmax in FIG. 9B is a upper limit value of the angle range in which the MEMS mirror 212 may be swung.

Therefore, in the voltage adjustment process according to the present embodiment, as described above, the drive voltage is increased until the swing angle when the MEMS mirror 212 is driven becomes equal to or larger than the threshold value at each of the plurality of drive frequencies. Then, when the MEMS mirror 212 of each sensor 2 is driven at the same drive frequency, the frequency at which the drive power becomes the minimum value is determined as the drive frequency of the MEMS mirror 212 of each sensor 2. In this way, it is possible to drive a plurality of MEMS mirrors 212 having different resonance frequencies with the same frequency and make the measurement timings of distances in a plurality of sensors having the MEMS mirror coincide. In addition, according to the method for determining the drive frequency according to the present embodiment, it is possible to make the measurement timings of distances in each sensor 2 coincide by suppressing narrowing the swing angle and increasing power consumption.

Figure 10:
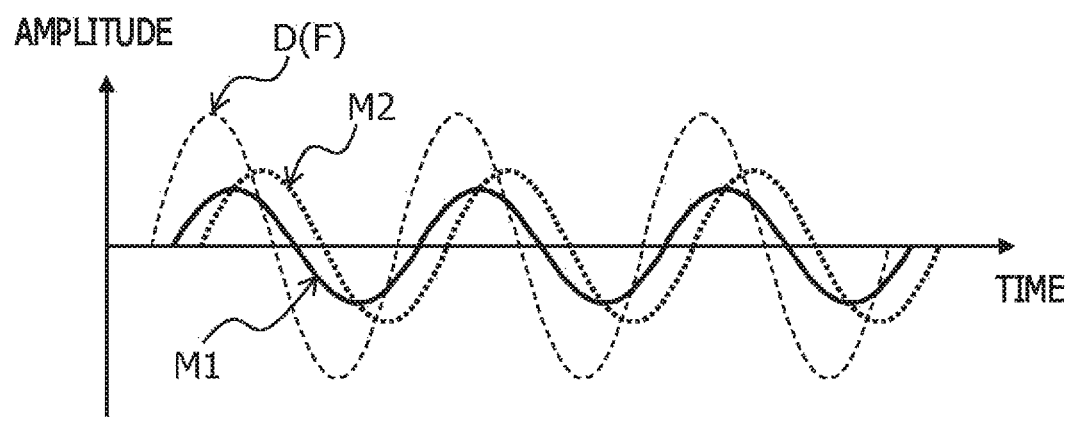
FIG. 10 is a waveform diagram for explaining a temporal change in a swing amplitude when the MEMS mirror is driven at a drive frequency different from a resonance frequency.

FIG. 10 is a waveform diagram for explaining a temporal change in the swing amplitude when the MEMS mirror is driven at a drive frequency different from a resonance frequency.

In the distance measuring device 1 according to the present embodiment, as described above, a drive frequency that is capable of synchronizing the operation of the MEMS mirror 212 of each sensor 2 is determined while suppressing the swing angle becoming narrower and increasing power consumption. However, in the distance measuring device 1 according to the present embodiment, since the drive frequency of each MEMS mirror 212 is out of the resonance frequency, a difference occurs in the phase of the drive frequency for each MEMS mirror 212. For example, FIG. 10 illustrates a curve M1 illustrating a temporal change of the swing amplitude in the first sensor 2A when the first sensor 2A and the second sensor 2B are driven at a drive frequency different from the resonance frequency, and a curve M2 illustrating the temporal change of the swing amplitude in the second sensor 2. In addition, FIG. 10 illustrates a drive signal D(F) of the frequency F. In this way, in a case where the MEMS mirror 212 is operated at a drive frequency different from the resonance frequency, a phase shift occurs in accordance with the difference from the resonance frequency.

Therefore, in the present embodiment, the above synchronization process is performed, the frequency of the sensor signal (sensor clock) used for generating a drive signal of the MEMS mirror 212 in each sensor 2 is synchronized with the master clock, and the phases of the sensor signal are set to coincide. In the distance measuring device 1 according to the present embodiment, as described above, a master clock corresponding to the drive frequency is generated in the sensor 2A specified as the master sensor among the plurality of sensors 2 and the master clock is transmitted to the other sensors 2. In this way, the plurality of sensors 2 including the master sensor 2A may adjust the phase of the sensor signal (sensor clock) generated based on a monitor signal output from the angle measurement unit 242 based on the same master clock in the own sensor 2, respectively.

Further, in the present embodiment, the phase offset amount is calculated based on the amount of a change in an angle with respect to the non-resonance direction of the MEMS mirror 212, and the phase of the sensor signal is obtained by the offset adjustment based on the calculated offset amount.

Figure 11:
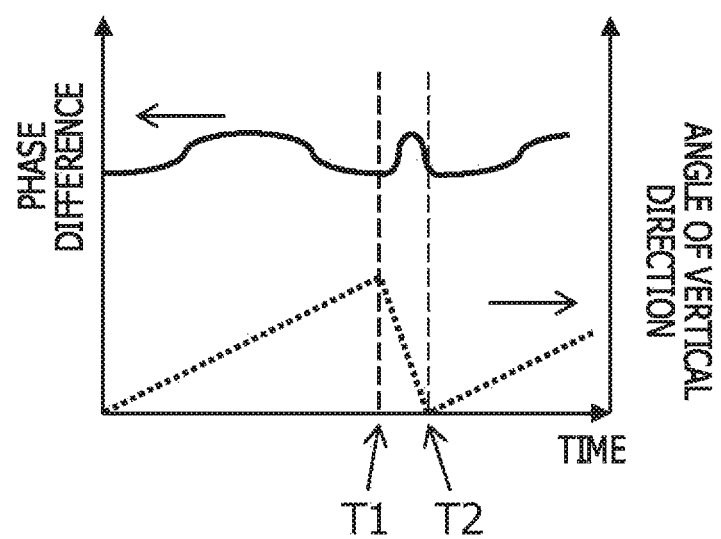
FIG. 11 is a graph for explaining a relationship between an angle in a vertical direction and a phase difference of a drive signal.

FIG. 11 is a graph for explaining a relationship between an angle in a vertical direction and a phase difference of a drive signal.

Scanning with the laser beam 5 in the MEMS mirror 212 is performed, for example, by a raster scan as illustrated in FIG. 8A. For this reason, for example, the phase of the drive signal may fluctuate due to the influence of the time taken to return the emission direction of the laser beam 5 from the scanning end point SE to the scanning start point SS, and the like. The bold dotted line illustrated in FIG. 11 illustrates a temporal change in the drive angle in the vertical direction (non-resonance direction) in the MEMS mirror 212. In addition, the bold curve illustrated in FIG. 11 illustrates the offset amount (phase difference) of the phase of the sensor signal calculated by the offset amount calculation unit 273. As illustrated in FIG. 11, the phase difference fluctuates locally and is increasing at times T1 to T2 when the drive angle of the MEMS mirror 212 in the vertical direction is decreasing. In the present embodiment, the offset amount is calculated with respect to the fluctuation of the local phase difference caused by the change in the drive angle of the MEMS mirror 212 in the vertical direction, and the offset adjustment of the phase of the sensor signal is performed. Therefore, according to the present embodiment, it is possible not only to adjust the phase difference with respect to a relatively long cycle due to start-up of the distance measuring device 1, temperature change, and the like but also to adjust a relatively fast phase fluctuation within one frame.

The functional configuration of the sensor 2 according to the present embodiment is not limited to the configuration illustrated in FIG. 2 and may be changed as appropriate. Similarly, the functional configuration of the control device 3 according to the present embodiment is not limited to the configuration illustrated in FIG. 3 and may be changed as appropriate. For example, the sensor 2 may drive the MEMS mirror 212 in the vertical direction as the resonance direction and the horizontal direction as the non-resonance direction when scanning a laser beam for one frame period.

In addition, the process performed by the distance measuring device 1 according to the present embodiment is not limited to the process illustrated in FIGS. 4A, 4B, and 5 to 7 and may be changed as appropriate. For example, the frequency range to be swept in the voltage adjustment process (step S6) may be from a minimum frequency to a maximum frequency among the resonance frequencies of the plurality of sensors 2, respectively.

Further, the number of the sensors 2 in the distance measuring device 1 according to the present embodiment is not limited to four illustrated in FIG. 1 and the like, but may be two, three, or five or more.

Figure 12:
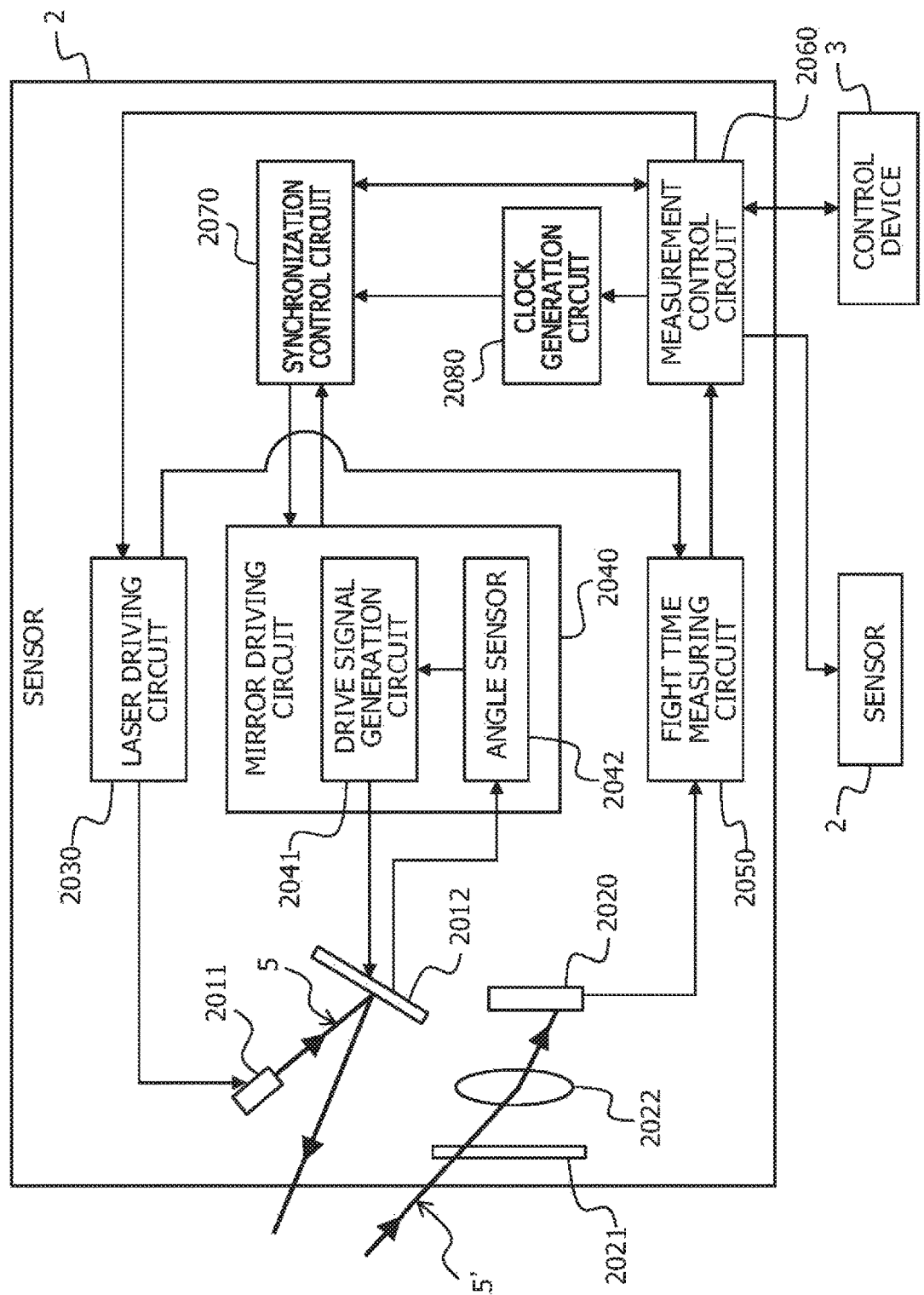
FIG. 12 is a diagram illustrating a hardware configuration of the sensor.
Figure 13:
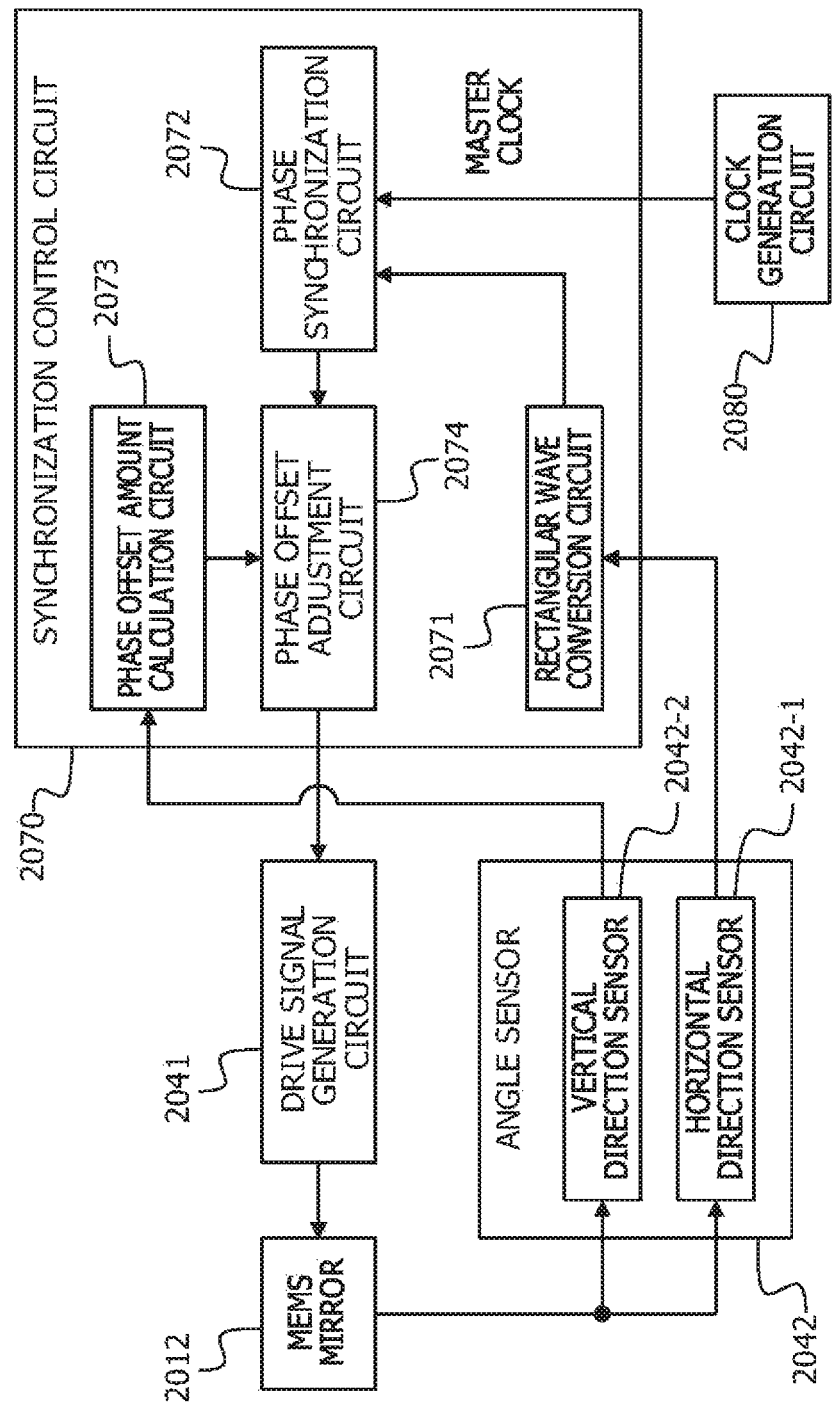
FIG. 13 is a diagram illustrating a configuration of a synchronization control circuit.

FIG. 12 is a diagram illustrating a hardware configuration of the sensor. FIG. 13 is a diagram illustrating a configuration of a synchronization control circuit.

As illustrated in FIG. 12, the sensor 2 according to the present embodiment includes a laser diode 2011 and a MEMS mirror 2012 that function as the light projecting unit 210. The laser beam 5 emitted from the laser diode 2011 advances in the predetermined emission direction after being reflected by the MEMS mirror 2012. In addition, the sensor 2 includes a light receiving element 2020, a band pass filter 2021, and a condensing lens 2022 that function as the light receiving unit 220. The laser beam 5' reflected by the object or the like passes through the band pass filter 2021 and the condensing lens 2022 and is incident on the light receiving element 2020. The light receiving element 2020 outputs an electric signal corresponding to the intensity of the incident laser beam 5'.

In addition, the sensor 2 includes a laser driving circuit 2030 that functions as the laser driving unit 230, a mirror driving circuit 2040 that functions as the mirror driving unit 240, and a flight time measuring circuit 2050 that functions as the flight time measuring unit 250. Among them, the mirror driving circuit 2040 includes a drive signal generation circuit 2041 that functions as the drive signal generation unit 241 and an angle sensor 2042 that functions as the angle measurement unit 242. Here, as illustrated in FIG. 13, the angle sensor 2042 includes a horizontal direction sensor 2042-1 that measures the angle in the horizontal direction (resonance direction) of the MEMS mirror 2012, and a vertical direction sensor 2042-2 that measures the angle in the vertical direction (non-resonance direction) of the MEMS mirror 2012.

Further, the sensor 2 includes a measurement control circuit 2060 that functions as the measurement control unit 260, a synchronization control circuit 2070 that functions as the synchronization control unit 270, and a clock generation circuit 2080 that functions as the master clock generation unit 280.

As illustrated in FIG. 13, the synchronization control circuit 2070 of the sensor 2 includes a rectangular wave conversion circuit 2071, a phase synchronization circuit 2072, a phase offset amount calculation circuit 2073, and a phase offset adjustment circuit 2074. The rectangular wave conversion circuit 2071 functions as the sensor clock generation unit 271, and the phase synchronization circuit 2072 functions as the phase synchronization unit 272. The phase offset amount calculation circuit 2073 functions as the offset amount calculation unit 273, and the phase offset adjustment circuit 2074 functions as the offset adjustment unit 274.

The hardware configuration of the sensor 2 according to the present embodiment is not limited to the configurations illustrated in FIGS. 12 and 13 and may be changed as appropriate. For example, each of the circuits in the sensor 2 may be a separate circuit device (circuit component) or may be built in one circuit device.

Second Embodiment

Figure 14:
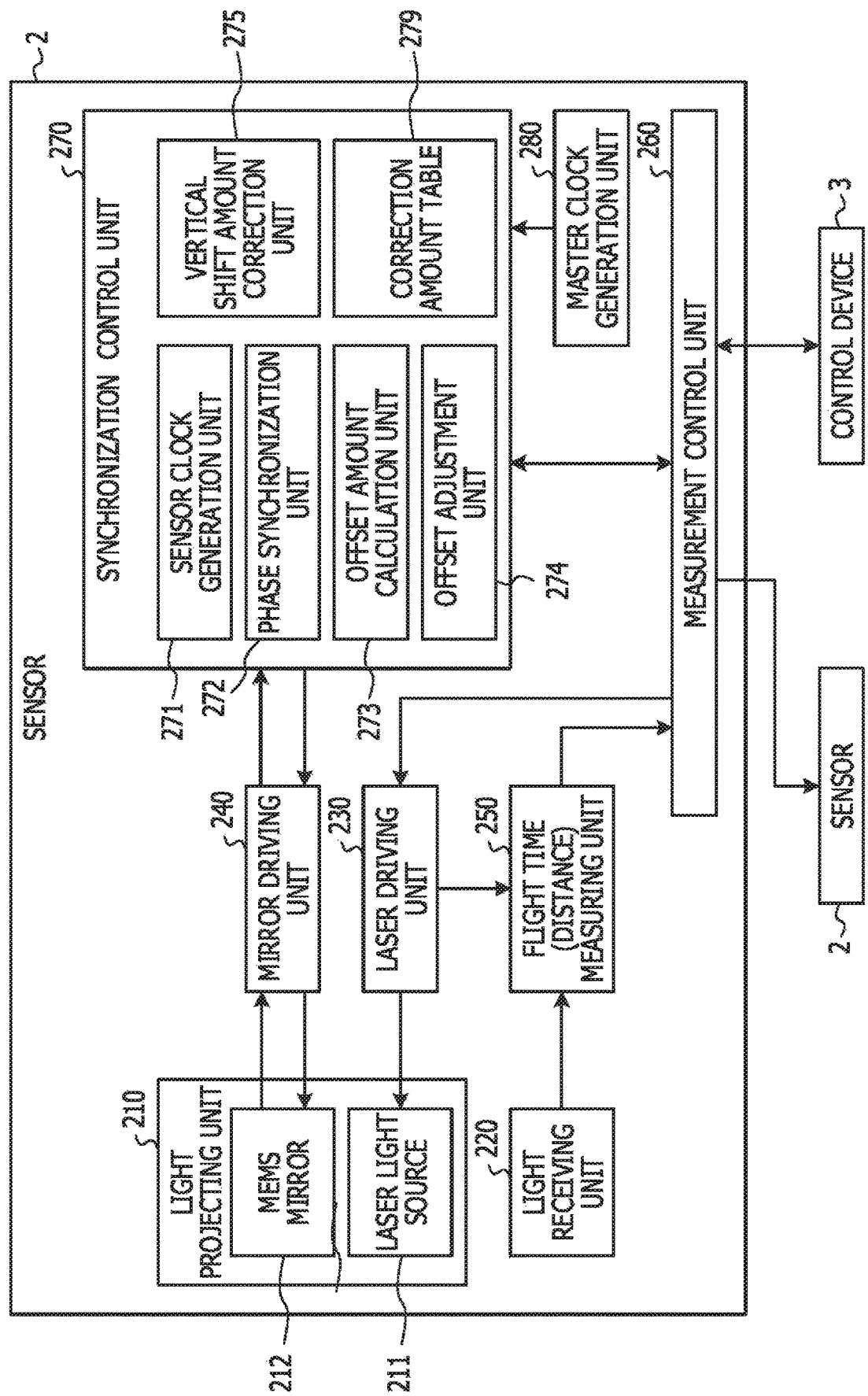
FIG. 14 is a diagram illustrating a functional configuration of a sensor in a distance measuring device according to a second embodiment.

FIG. 14 is a diagram illustrating a functional configuration of a sensor in a distance measuring device according to a second embodiment.

As illustrated in FIG. 14, the sensor 2 in the distance measuring device 1 of the present embodiment includes the light projecting unit 210, the light receiving unit 220, the laser driving unit 230, the mirror driving unit 240, the flight time (distance) measuring unit 250, and the measurement control unit 260. In addition, the sensor 2 further includes the synchronization control unit 270 and the master clock generation unit 280. Among the sensors 2 according to the present embodiment, the functional blocks other than the synchronization control unit 270 respectively have the same function as the functional block of the sensor 2 according to the first embodiment.

Based on the master clock generated by the master clock generation unit 280 or the master clock transferred from the sensor 2 in the following sentence, the synchronization control unit 270 of the sensor 2 according to the present embodiment synchronizes the operation of the mirror driving unit 240 of the own sensor 2 with the operations of the mirror driving unit 240 of the other sensors 2. The synchronization control unit 270 of the sensor 2 according to the present embodiment includes the sensor clock generation unit 271, the phase synchronization unit 272, the offset amount calculation unit 273, the offset adjustment unit 274, a vertical shift amount correction unit 275, and a correction amount table 279. Based on the measurement result of the amplitude in the resonance direction by the angle measurement unit 242 of the mirror driving unit 240, the sensor clock generation unit 271 generates a sensor clock (in-sensor clock) corresponding to a swing frequency in the resonance direction of the MEMS mirror 212. The phase synchronization unit 272 synchronizes the phase of the generated sensor signal with the phase of the master clock. The offset amount calculation unit 273 calculates the offset amount with respect to the phase of the sensor signal based on the measurement result of the angle in the non-resonance direction by the angle measurement unit 242 of the mirror driving unit 240. Here, the non-resonance direction is a direction orthogonal to the resonance direction.

In addition, the offset amount of the phase is a phase shift amount of the sensor signal caused by the angle change of the non-resonance direction of the emission direction of the laser beam. The vertical shift amount correction unit 275 calculates the correction amount of the phase with respect to the angle change of the MEMS mirror 212 in the vertical direction within one frame based on the correction amount table 279 prepared beforehand. The offset adjustment unit 274 adjusts the phase of the sensor signal to be output to the mirror driving unit 240 based on the offset amount calculated by the offset amount calculation unit 273 and the correction amount calculated by the vertical shift amount correction unit 275.

FIG. 15 is a diagram illustrating a correction amount table.

For example, as illustrated in FIG. 15, the correction amount table 279 of the sensor 2 according to the present embodiment is a table in which the correspondence between the angle in the vertical direction (non-resonance direction) of the MEMS mirror 212 and the correction time (phase correction amount) is registered. That is, in the distance measuring device 1 according to the present embodiment, the phase of the sensor signal is adjusted based on the phase offset amount described in the first embodiment and the angle in the vertical direction (non-resonance direction) of the MEMS mirror 212. The correction amount table 279 is created based on the angle in the non-resonance direction of the MEMS mirror 212 when the MEMS mirror 212 of each sensor 2 is driven at a predetermined drive frequency such as a resonance frequency, and the phase shift amount of the sensor signal. Here, the phase shift amount of the sensor signal is, for example, a difference between an actually measured value in one frame period and a theoretical value calculated based on the specification of the MEMS mirror 212.

Similarly to the distance measuring device 1 of the first embodiment, the distance measuring device 1 according to present embodiment performs the process illustrated in FIGS. 4A and 4B. At this time, the pre-processes (steps S1 to S9) for determining the drive frequency of the MEMS mirror 212 of each sensor 2 are performed according to the procedure described in the first embodiment. On the other hand, as the synchronization process (step S14) when the distance is measured by driving the MEMS mirror 212 with the drive frequency determined in the pre-process, each sensor 2 performs, for example, the process as illustrated in FIG. 16.

Figure 16:
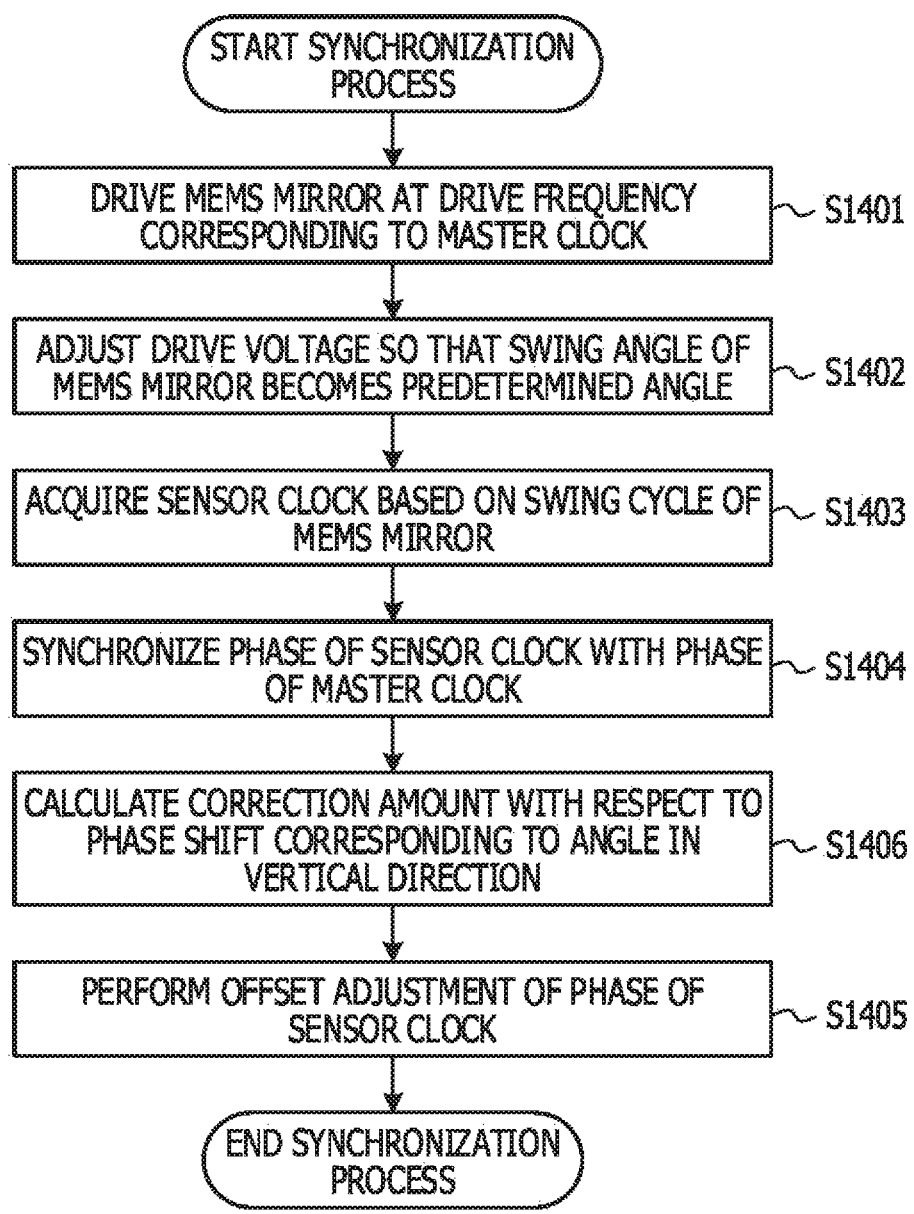
FIG. 16 is a flowchart illustrating contents of a synchronization process performed by each sensor in the distance measuring device according to the second embodiment.

FIG. 16 is a flowchart illustrating contents of a synchronization process performed by each sensor in the distance measuring device according to the second embodiment.

Upon starting the synchronization process, the sensor 2 according to the present embodiment first drives the MEMS mirror 212 at a drive frequency corresponding to the master clock (step S1401). The process in step S1401 is performed by the mirror driving unit 240 of the sensor 2. At this time, the synchronization control unit 270 outputs the master clock to the drive signal generation unit 241 of the mirror driving unit 240 as a sensor signal. The drive signal generation unit 241 generates a drive signal for the MEMS mirror 212 based on the frequency and the phase of the master clock and outputs the drive signal to the MEMS mirror 212.

Next, the sensor 2 adjusts the drive voltage so that the swing angle of the MEMS mirror 212 becomes the predetermined angle (step S1402). The process of step S1402 is performed by the mirror driving unit 240. As the process in step S1402, the mirror driving unit 240 performs, for example, the voltage adjustment process in steps S601 to S608 illustrated in FIG. 5.

Next, the sensor 2 acquires the sensor signal based on the swing cycle of the MEMS mirror (step S1403). The step S1403 is performed by the angle measurement unit 242 of the mirror driving unit 240 and the sensor clock generation unit 271 of the synchronization control unit 270. The angle measurement unit 242 measures the swing angle of the MEMS mirror 212 with respect to the resonance direction when the MEMS mirror 212 is operated at the resonance frequency and outputs a sine wave indicating the temporal change of the swing angle to the synchronization control unit 270. In the sensor clock generation unit 271, the synchronization control unit 270 converts a sine wave indicating the temporal change of the swing angle into a rectangular wave (sensor clock) having the same frequency as the sine wave.

Next, the sensor 2 synchronizes the phase of the sensor clock with the phase of the master clock (step S1404). The process of step S1404 is performed by the phase synchronization unit 272 of the synchronization control unit 270. The phase synchronization unit 272 adjusts the phase of the drive signal by the PLL or the like so that the phase of the sensor clock is synchronized with the phase of the master clock.

Next, the sensor 2 calculates the correction amount with respect to the phase shift caused by the change in the angle in the vertical direction based on the angle of the MEMS mirror 212 in the vertical direction and the correction amount table 279 (step S1406). The process in step S1406 is performed by the vertical shift amount correction unit 275.

Next, the sensor 2 performs offset adjustment of the phase of the sensor signal (step S1405). The process in step S1405 is performed by the offset amount calculation unit 273 and the offset adjustment unit 274 of the synchronization control unit 270. The offset amount calculation unit 273 calculates the offset amount of the phase with respect to the sensor signal in which the phase is synchronized with the master clock based on the angle in the non-resonance direction of the MEMS mirror 212. The offset adjustment unit 274 performs offset adjustment of the phase of the sensor signal based on the offset amount calculated by the offset amount calculation unit 273 and the correction amount calculated by the vertical shift amount correction unit 275. When the offset adjustment unit 274 outputs the sensor signal after the offset adjustment to the mirror driving unit 240, the synchronization process ends.

After the synchronization process is ended, each sensor 2 performs the distance measurement process (step S15) while driving the MEMS mirror 212 based on the sensor signal obtained by the synchronization process. For example, each sensor 2 measures the distance to the object by operating the laser beam with the horizontal direction as the resonance direction. At this time, each sensor 2 performs the synchronization process of FIG. 16, for example, every time scanning with the laser beam in the horizontal direction is ended once, synchronizes the phase with the master clock, and further generates a sensor signal which is obtained by the offset adjustment based on the shift amount in the non-resonance direction.

As described above, each sensor 2 of the distance measuring device 1 according to the present embodiment performs the synchronization process of FIG. 16, for example, every time scanning with the laser beam in the horizontal direction is ended once, synchronizes the phase with the master clock, further generates a sensor signal which is obtained by the offset adjustment based on the shift amount in the non-resonance direction. Therefore, according to the present embodiment, it is possible to suppress the phase shift caused by the angle change of the MEMS mirror 212 in the vertical direction within one frame period, thereby further improving the synchronization accuracy of the plurality of sensors 2.

The hardware configuration of the sensor 2 according to the present embodiment is the same as the hardware configuration illustrated in FIG. 12. However, the synchronization control circuit 2070 that functions as the synchronization control unit 270 in the sensor 2 according to the present embodiment has a circuit configuration as illustrated in FIG. 17.

Figure 17:
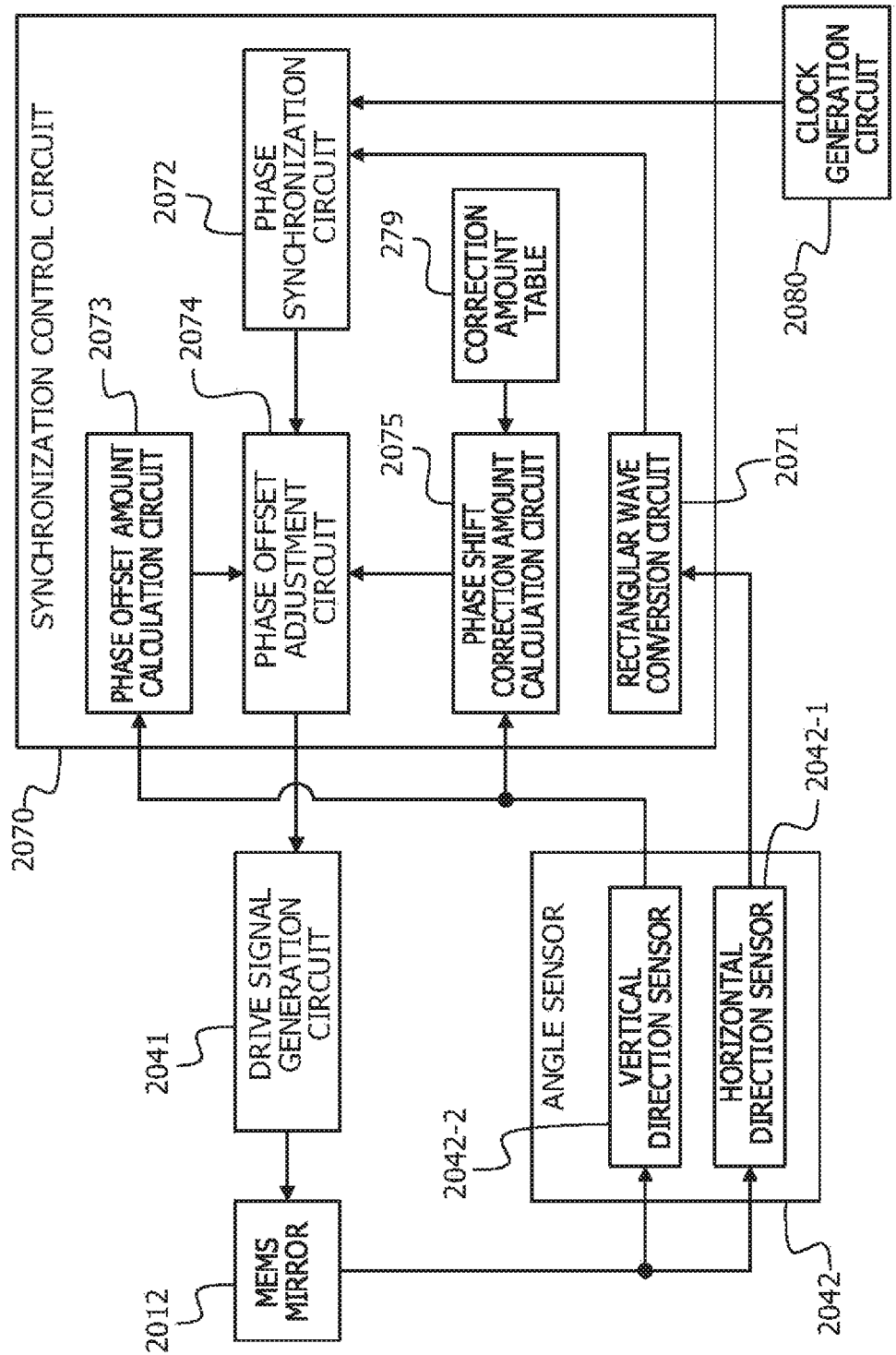
FIG. 17 is a diagram illustrating a configuration of a synchronization control circuit in the sensor according to the second embodiment.

FIG. 17 is a diagram illustrating a configuration of a synchronization control circuit in the sensor according to the second embodiment.

As illustrated in FIG. 17, the synchronization control circuit 2070 of the sensor 2 according to the present embodiment includes the rectangular wave conversion circuit 2071, the phase synchronization circuit 2072, the phase offset amount calculation circuit 2073, and the phase offset adjustment circuit 2074. The rectangular wave conversion circuit 2071 functions as the sensor clock generation unit 271, and the phase synchronization circuit 2072 functions as the phase synchronization unit 272. The phase offset amount calculation circuit 2073 functions as the offset amount calculation unit 273, and the phase offset adjustment circuit 2074 functions as the offset adjustment unit 274.

In addition, the synchronization control circuit 2070 of the sensor 2 according to the present embodiment further includes a phase shift correction amount calculation circuit 2075 and a correction amount table 279. The phase shift correction amount calculation circuit 2075 functions as the vertical shift amount correction unit 275.

Third Embodiment

In the present embodiment, the distance measuring device 1 in which the phase of the master clock may be adjusted in the synchronization control unit 270 (the synchronization control circuit 2070) of the sensor 2 will be described.

The hardware configuration of the sensor 2 in the distance measuring device 1 according to the present embodiment is the same as the hardware configuration illustrated in FIG. 12. However, the synchronization control circuit 2070 that functions as the synchronization control unit 270 in the sensor 2 according to the present embodiment has a circuit configuration as illustrated in FIG. 18.

Figure 18:
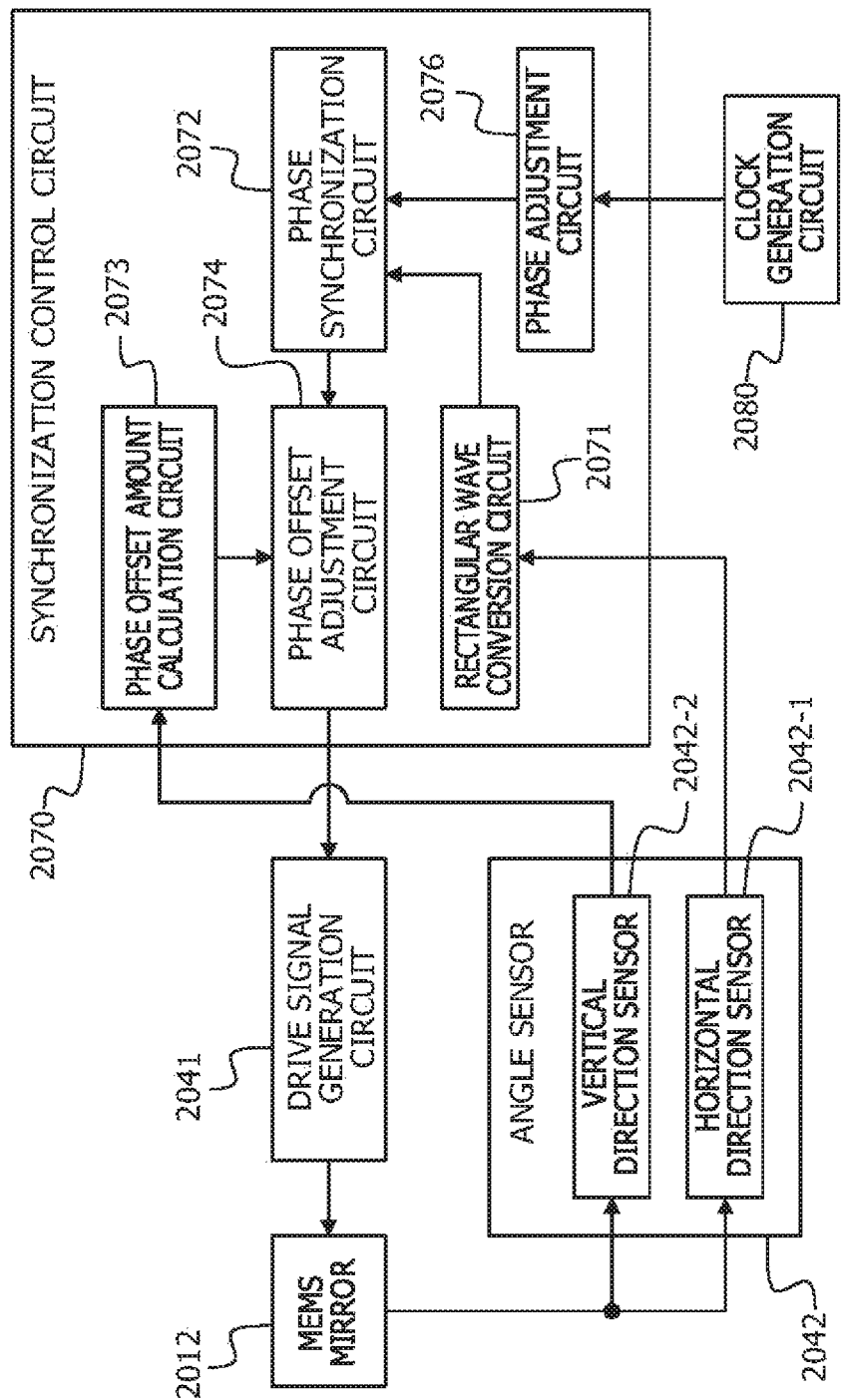
FIG. 18 is a diagram illustrating a configuration of a synchronization control circuit in a sensor according to a third embodiment.

FIG. 18 is a diagram illustrating a configuration of a synchronization control circuit in the sensor according to the third embodiment.

As illustrated in FIG. 18, the synchronization control circuit 2070 of the sensor 2 according to the present embodiment includes the rectangular wave conversion circuit 2071, the phase synchronization circuit 2072, the phase offset amount calculation circuit 2073, and the phase offset adjustment circuit 2074. The rectangular wave conversion circuit 2071 functions as the sensor clock generation unit 271, and the phase synchronization circuit 2072 functions as the phase synchronization unit 272. The phase offset amount calculation circuit 2073 functions as the offset amount calculation unit 273, and the phase offset adjustment circuit 2074 functions as the offset adjustment unit 274.

In addition, the synchronization control circuit 2070 of the sensor 2 according to the present embodiment further includes a phase adjustment circuit 2076. In a case where the sensor 2 is a sensor specified as the master sensor, the phase adjustment circuit 2076 adjusts the phase of the master clock generated by the clock generation circuit 2080. In addition, in a case where the sensor 2 is a sensor other than the sensor specified as the master sensor, the phase adjustment circuit 2076 adjusts the phase of the master clock transferred from the master sensor. For example, the phase adjustment circuit 2076 adjusts the phase shift of the master clock between the sensors due to the delay of the master clock occurring in the transmission path from the master sensor to the own sensor 2. In addition, the phase adjustment circuit 2076 may independently adjust the phase of the master clock for each sensor 2, for example, according to the manner of the distance measurement process by each sensor 2.

The control device 3 in the distance measuring device 1 described in each of the above embodiments may be realized by, for example, a computer and a control program executed by a computer. Hereinafter, the control device 3 realized by a computer and a program will be described with reference to FIG. 19.

Figure 19:
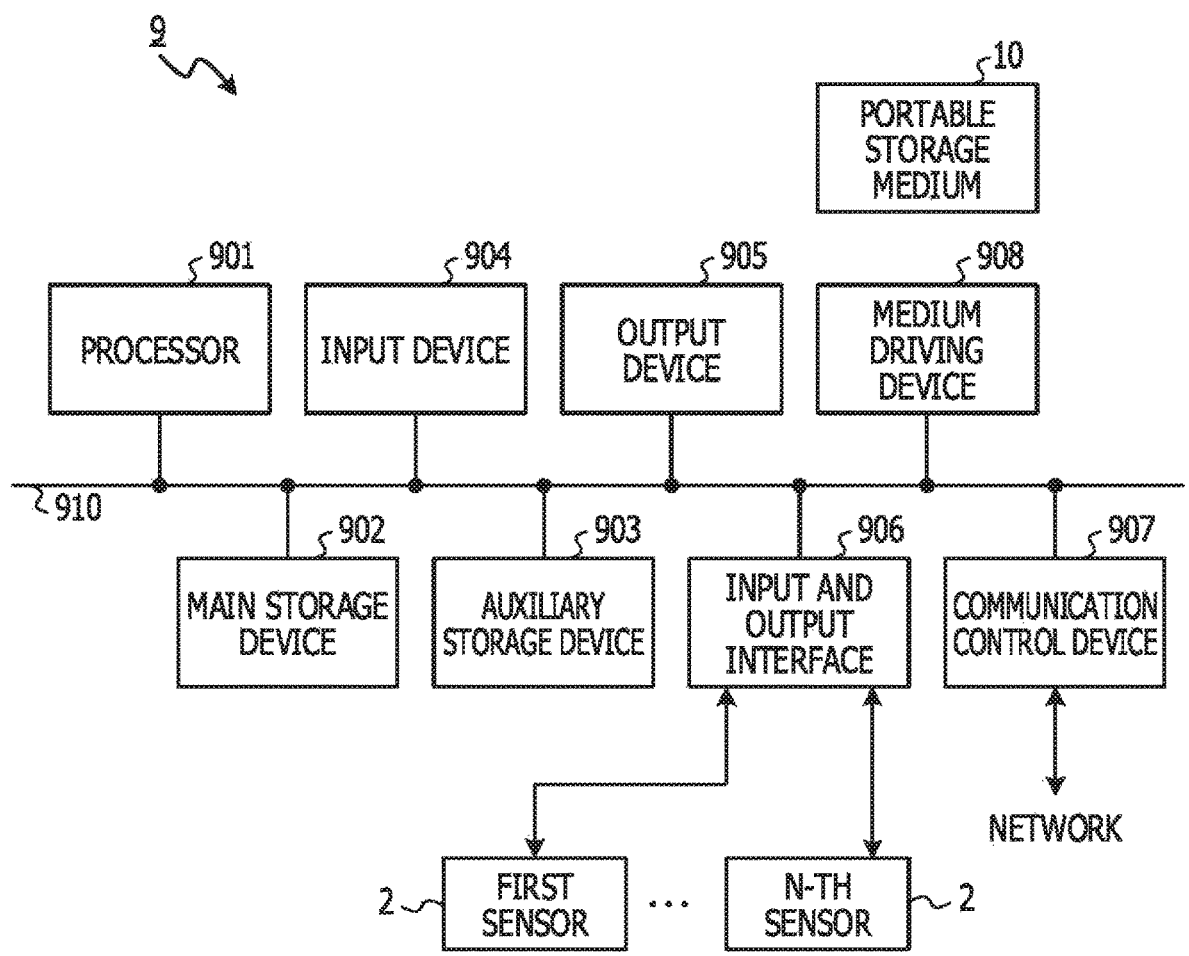
FIG. 19 is a diagram illustrating a hardware configuration of a computer.

FIG. 19 is a diagram illustrating a hardware configuration of a computer.

As illustrated in FIG. 19, the computer 9 includes a processor 901, a main storage device 902, an auxiliary storage device 903, an input device 904, an output device 905, an input and output interface 906, a communication control device 907, and a medium driving device 908. The elements 901 to 908 in the computer 9 are mutually connected by a bus 910, and data may be exchanged between the elements.

The processor 901 is a central processing unit (CPU), a micro processing unit (MPU), or the like. The processor 901 controls the overall operation of the computer 9 by executing various programs including an operating system. In addition, for example, the processor 901 executes a control program including each process performed by the control device 3 in the sequence diagrams illustrated in FIGS. 4A and 4B. The drive frequency determination process (step S9) in the control program executed by the processor 901 includes, for example, steps S901 to S908 illustrated in the flowchart of FIG. 6.

The main storage device 902 includes a read only memory (ROM) and a random access memory (RAM) (not illustrated). In the ROM of the main storage device 902, for example, a predetermined basic control program and the like read by the processor 901 when the computer 9 is activated are recorded in advance. On the other hand, the RAM of the main storage device 902 is used by the processor 901 as a work storage area accordingly when executing various programs. The RAM of the main storage device 902 may be used as the storage unit 390 in the distance measuring device 1 illustrated in FIG. 3, for example.

The auxiliary storage device 903 is a storage device having a larger capacity than the RAM of the main storage device 902, and is, for example, a nonvolatile memory (including solid state drive (SSD)) or the like such as a hard disc drive (HDD) or a flash memory. The auxiliary storage device 903 may be used for storing various programs and various data executed by the processor 901. The auxiliary storage device 903 may be used for storing, for example, a control program including each process performed by the control device 3 in the sequence diagrams illustrated in FIGS. 4A and 4B. In addition, the auxiliary storage device 903 may be used, for example, as the storage unit 390 in the control device 3 of FIG. 3.

The input device 904 is, for example, a keyboard device, a touch panel device, or the like. When an operator (user) of the computer 9 performs a predetermined operation on the input device 904, the input device 904 transmits the input information associated with the operation content to the processor 901. The input device 904 may be used, for example, for inputting instructions to start a pre-process or distance measurement, instructions related to other processes executable by the computer 9, various setting values, or the like.

The output device 905 is, for example, a display device such as a liquid crystal display device or a printer. For example, the output device 905 may be used to visualize the result of the pre-process (the drive frequency determined by the drive frequency determination process), the measurement result of the distance to the object, and the like and present the result to the operator.

The input and output interface 906 connects the computer 9 to another electronic device. The input and output interface 906 includes, for example, a connector of a Universal Serial Bus (USB) standard. The input and output interface 906 may be used, for example, for connection between the computer 9 and N sensors 2A to 2N.

The communication control device 907 is a device that connects the computer 9 to a network such as the Internet and controls various communications between the computer 9 and other communication devices via the network. The communication control device 907 may be used, for example, for communication between the computer 9 and a server device that aggregates and manages the distance information calculated by the computer 9. In addition, for example, the communication control device 907 may also be used for connecting the computer 9 and the plurality of sensors 2.

The medium driving device 908 reads out programs and data recorded on a portable storage medium 10 and writes the data and the like stored in the auxiliary storage device 903 to the portable storage medium 10. For the medium driving device 908, for example, a memory card reader and writer compatible with one or more types of standards may be used. In a case where a memory card reader and writer is used as the medium driving device 908, standards compatible with the memory card reader and writer, for example, a memory card (flash memory) of a secure digital (SD) standard or the like may be used as the portable storage medium 10. In addition, as the portable storage medium 10, for example, a flash memory having a USB standard connector may be used. Further, in a case where the computer 9 is equipped with an optical disc drive usable as the medium driving device 908, various optical discs recognizable by the optical disc drive may be used as the portable storage medium 10. Examples of optical discs usable as the portable storage medium 10 include a compact disc (CD), a digital versatile disc (DVD), a Blu-ray disc (Blu-ray is a registered trademark), and the like. For example, the portable storage medium 10 may be used to store a control program including each process performed by the control device 3 in the sequence diagrams illustrated in FIGS. 4A and 4B for storage of the control program. In addition, the auxiliary storage device 903 may be used, for example, as the storage unit 390 in the control device 3 of FIG. 3.

When the operator inputs an instruction to start the distance measurement using the input device 904 or the like to the computer 9, the processor 901 reads out and executes the control program stored in a non-transitory recording medium such as the auxiliary storage device 903. In the process, the processor 901 functions as the control signal generation unit 310, the information collection unit 320, and the drive frequency determination unit 330 in the control device 3 of FIG. 3. In addition, the input and output interface 906 of the computer 9 functions as the communication unit 305 of the control device 3. Further, the main storage device 902, the auxiliary storage device 903, the portable storage medium 10, and the like of the computer 9 function as the storage unit 390 of the control device 3.

The computer 9 which is operated as the distance measuring device 1 does not have to include all of the elements 901 to 908 illustrated in FIG. 19, and it is also possible to omit some elements according to a use and conditions. For example, the computer 9 may omit the communication control device 907 or the medium driving device 908.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distance measuring device comprising:
a memory;
a processor coupled to the memory and configured to
execute a collection process that includes driving a MEMS mirror in each of a plurality of sensors and collecting a drive voltage of the MEMS mirror satisfying a given condition, the plurality of sensors having the MEMS mirror that controls an emission direction of a laser beam with a same drive frequency,
execute a drive frequency determination process that includes determining a drive frequency of the MEMS mirror when measuring distances by the plurality of sensors based on the drive voltage of the MEMS mirror, the drive voltage being collected by the collection process for each of the plurality of drive frequencies, and
execute a control signal generation process that includes generating and transmitting a control signal to the plurality of sensors, the control signal including configuration information specifying the drive frequency as a drive frequency of the MEMS mirror in each of the plurality of sensors, and the configuration information including the drive frequency determined by the drive frequency determination process.

2. The distance measuring device according to claim 1, wherein the drive voltage that satisfies the given condition is a minimum drive voltage at which a swing angle of the MEMS mirror is equal to or larger than a threshold value or an upper limit value of a preset drive voltage.

3. The distance measuring device according to claim 1, further comprising:
the plurality of sensors;
wherein each of the plurality of sensors includes a drive signal generation circuit configured to generate a drive signal of the MEMS mirror based on a drive voltage at which the swing angle of the MEMS mirror when the MEMS mirror is driven at the drive frequency specified by the control signal is equal to or larger than a given angle range or based on an upper limit value of a preset drive voltage,
the control signal generation process includes generating a control signal and transmitting the control signal to the plurality of sensors, the control signal including information specifying each of the plurality of drive frequencies as the drive frequency of the MEMS mirror, and
the collection process includes collecting the drive voltage of the drive signal generated in the drive signal generation circuit of the plurality of sensors.

4. The distance measuring device according to claim 3, wherein at least one sensor of the plurality of sensors includes a master clock generation circuit configured to generate a master clock of the drive frequency specified as the control signal,
the plurality of sensors includes a phase synchronization circuit configured to synchronize a phase of a sensor clock used for generating a drive signal for driving the MEMS mirror with a phase of the master clock,
the control signal generation process includes transmitting the control signal to a first sensor of the plurality of sensors, the first sensor including the master clock generation circuit, and
the first sensor transfers the generated master clock to another sensor upon receiving the control signal.

5. The distance measuring device according to claim 4, wherein the drive signal generation circuit in each of the plurality of sensors controls the angle of the MEMS mirror in a first direction with the drive frequency and generates the drive signal that controls the angle of the MEMS mirror in a second direction different from the first direction to one direction, and
each of the plurality of sensors further includes an offset adjustment circuit configured to perform offset adjustment of the phase of the sensor clock based on the angle of the MEMS mirror in the second direction.

6. The distance measuring device according to claim 5, wherein each of the plurality of sensors further includes a correction circuit configured to calculate a correction amount of the phase of the sensor clock based on a correction amount table indicating a correspondence between an angle of the MEMS mirror in the second direction and a phase shift amount in the drive signal, and an angle of the MEMS mirror in the second direction.

7. The distance measuring device according to claim 5, wherein each of the plurality of sensors further includes a phase adjustment circuit configured to adjust the phase of the master clock.

8. The distance measuring device according to claim 1, wherein the plurality of drive frequencies for collecting the drive voltage of the MEMS mirror is a frequency between a minimum frequency and a maximum frequency among resonance frequencies of the plurality of MEMS mirrors.

9. The distance measuring device according to claim 1, wherein the drive frequency determination process includes determining a drive frequency at which the sum of drive power of the MEMS mirrors of the plurality of sensors is minimized.

10. A distance measuring method performed by a computer, the method comprising:
executing, by a processor of the computer, a collection process that includes driving a MEMS mirror in each of a plurality of sensors and collecting a drive voltage of the MEMS mirror satisfying a given condition, the plurality of sensors having the MEMS mirror that controls an emission direction of a laser beam with a same drive frequency,
executing, by the processor of the computer, a drive frequency determination process that includes determining a drive frequency of the MEMS mirror when measuring distances by the plurality of sensors based on the drive voltage of the MEMS mirror, the drive voltage being collected by the collection process for each of the plurality of drive frequencies,
executing, by the processor of the computer, a control signal generation process that includes generating and transmitting a control signal to the plurality of sensors, the control signal including configuration information specifying the drive frequency as a drive frequency of the MEMS mirror in each of the plurality of sensors, the configuration information including the drive frequency determined by the drive frequency determination process, and
executing, by the processor of the computer, a measurement process that includes obtaining a result of measurement of each of the plurality of sensors by driving the MEMS mirror with the drive frequency specified by the control signal, the measurement result including a measurement result of a distance from the sensor to an object.

11. The distance measuring method according to claim 10, wherein the control signal generation process further includes
selecting first sensor of the plurality of sensors,
transmitting the control signal to the first sensor,
causing the first sensor to generate a master clock of the drive frequency specified by the control signal and transfer the generated master clock to another sensor, and
causing the phase of the sensor clock used for generating a drive signal for driving the MEMS mirror to be synchronized with a phase of the master clock in each of the plurality of sensors.

12. The distance measuring method according to claim 11, further comprising:
causing each of the plurality of sensors
to control the angle of the MEMS mirror in the first direction with the drive frequency and the angle of the MEMS mirror in a second direction different from the first direction to one direction by each of the plurality of sensors, and to calculate a correction amount of the phase of the sensor clock by referring to a correction amount table indicating a correspondence between an angle of the MEMS mirror in the second direction and a phase shift amount in the sensor clock.

13. The distance measuring method according to claim 10, wherein the drive frequency determination process includes determining a drive frequency at which the sum of drive power of the MEMS mirrors of the plurality of sensors is minimized.

14. A non-transitory computer-readable storage medium for storing a program that causes a processor to execute a distance measurement process, the distance measurement process comprising:

executing a collection process that includes driving a MEMS mirror in each of a plurality of sensors and collects a drive voltage of the MEMS mirror satisfying a given condition, the plurality of sensors having the MEMS mirror that controls an emission direction of a laser beam with a same drive frequency, executing a drive frequency determination process that includes determining a drive frequency of the MEMS mirror when measuring distances by the plurality of sensors based on the drive voltage of the MEMS mirror, the drive voltage being collected by the collection process for each of the plurality of drive frequencies, executing a control signal generation process that includes generating and transmitting a control signal to the plurality of sensors, the control signal including configuration information specifying the drive frequency as a drive frequency of the MEMS mirror in each of the plurality of sensors, and the configuration information including the drive frequency determined by the drive frequency determination process, and executing a measurement process that includes obtaining a result of measurement of each of the plurality of sensors by driving the MEMS mirror with the drive frequency specified by the control signal, the measurement result including a measurement result of a distance from the sensor to an object.

15. The non-transitory computer-readable storage medium according to claim 14, wherein the control signal generation process further includes
selecting first sensor of the plurality of sensors,
transmitting the control signal to the first sensor,
causing the first sensor to generate a master clock of the drive frequency specified by the control signal and transfer the generated master clock to another sensor, and
causing the phase of the sensor clock used for generating a drive signal for driving the MEMS mirror to be synchronized with a phase of the master clock in each of the plurality of sensors.

16. The non-transitory computer-readable storage medium according to claim 14, wherein the drive frequency determination process includes determining a drive frequency at which the sum of drive power of the MEMS mirrors of the plurality of sensors is minimized.

* * * * *